United States Patent [19]

Andrade

[11] Patent Number: 5,623,638

[45] Date of Patent: Apr. 22, 1997

[54] MEMORY CONTROL UNIT WITH PROGRAMMABLE EDGE GENERATOR TO MINIMIZE DELAY PERIODS FOR CRITICAL DRAM TIMING PARAMETERS

[75] Inventor: Victor F. Andrade, Austin, Tex.

[73] Assignee: Advanced Micro Devices, Inc., Sunnyvale, Calif.

[21] Appl. No.: 343,225

[22] Filed: Nov. 22, 1994

[51] Int. Cl.$^6$ ................................................... G06F 13/14
[52] U.S. Cl. ........................................... 395/494; 395/432
[58] Field of Search ..................................... 395/494, 550, 395/432; 365/194, 233, 233.5, 193, 78, 80, 189.12

[56] References Cited

U.S. PATENT DOCUMENTS

| | | | |
|---|---|---|---|
| 4,596,004 | 6/1986 | Kaufman | 365/233 |
| 4,695,967 | 9/1987 | Kodama et al. | 345/28 |
| 5,274,796 | 12/1993 | Conner | 395/550 |
| 5,384,750 | 1/1995 | Lee | 365/233 |
| 5,479,647 | 12/1995 | Harness et al. | 395/550 |

Primary Examiner—Eddie P. Chan
Assistant Examiner—Kevin L. Ellis
Attorney, Agent, or Firm—Conley, Rose & Tayon, P.C.; B. Noel Kivlin

[57] ABSTRACT

A system is disclosed for minimizing delays for critical timing parameters during DRAM transactions. The present invention comprises a modified memory control unit which includes a programmable DRAM edge generator for increasing the resolution times for assertion of DRAM control signals that operates using both edges of the memory clock. The memory control unit (or MCU) includes configuration registers that are configured during system initialization by the BIOS to set desired delay times for critical DRAM timing parameters, such as assertion of the row address strobe (RAS) signal, the assertion of the column address strobe (CAS) signal, and the timing of the switch from the row address to the column address. The DRAM edge generator includes shifter delay circuits that control the timing of the control signals based upon the status of the configuration registers. The shifter delay circuits also receives an enable signal from the DRAM controller, a precharge signal from a bank precharge counter, and bank and byte select signals from the DRAM address router.

17 Claims, 12 Drawing Sheets

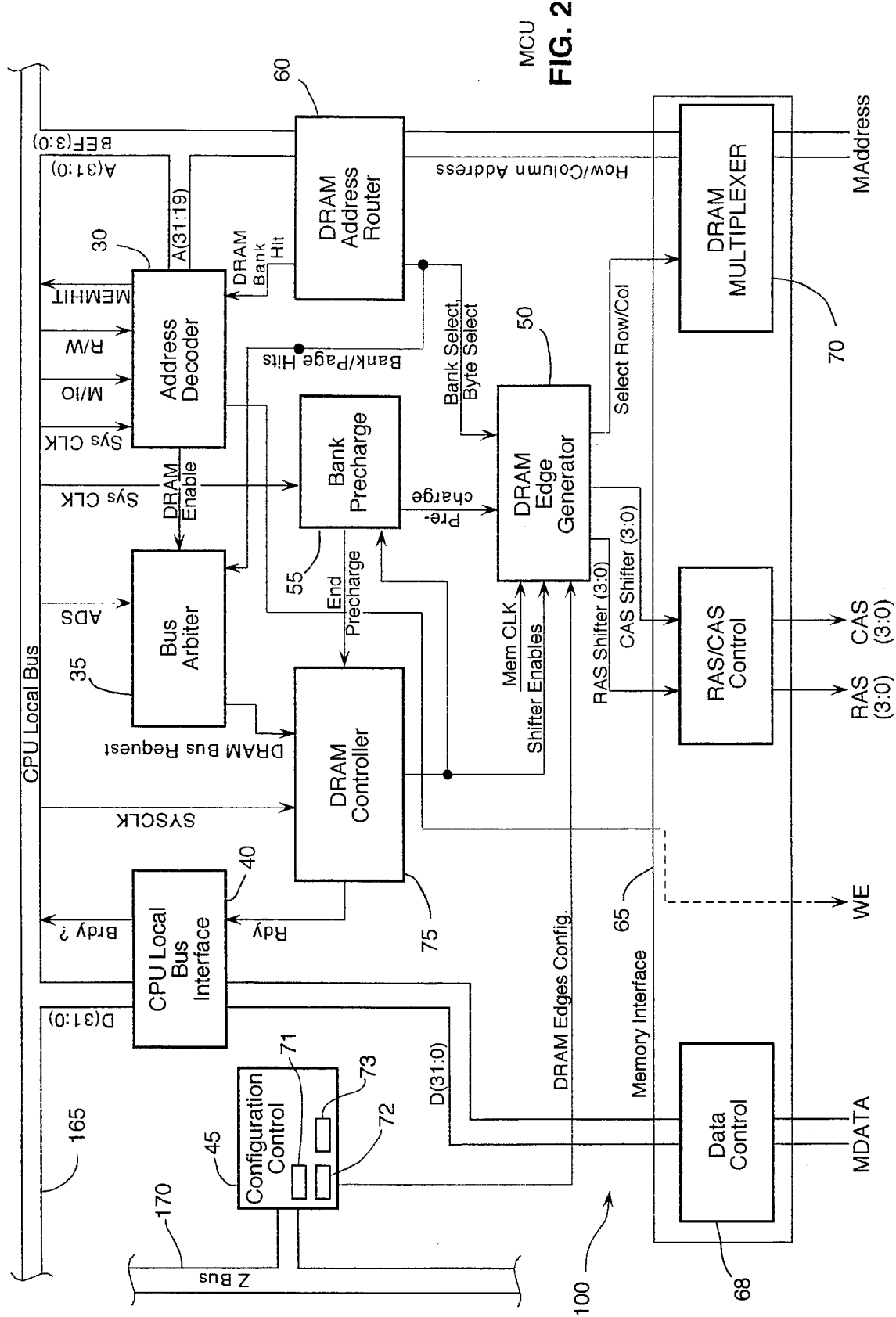

MEMORY CONTROL UNIT WITH PROGRAMMABLE EDGE GENERATOR TO MINIMIZE DELAY PERIODS FOR CRITICAL DRAM TIMING PARAMETERS

BACKGROUND OF THE INVENTION

1. Field of the Invention

The present invention relates generally to the transfer of data between memory and various components in a computer system. More particularly, this invention relates to a system for expediting transactions between computer components and dynamic random access memory (DRAM). Still more particularly, the present invention relates to a memory control unit (MCU) which includes an edge generator for defining the timing of control signals during DRAM transactions and for minimizing any necessary delay required in the control signal timing.

2. Description of the Relevant Art

FIG. 1 is a block diagram of a prior art computer system 10 that comprises a microprocessor or central processing unit ("CPU") 12, a CPU local bus 14 coupled to the CPU 12 and to a memory controller 16, and a local bus peripheral device 18 also coupled to the CPU local bus 14. A system memory 17 also is shown coupled to the memory controller 16 through a memory bus 15. In addition, a PCI standard bus 20 couples to the CPU local bus 14 through a PCI bus bridge 22. A PCI peripheral device 28 is shown coupled to the PCI bus 20. The PCI peripheral device 28 may comprise a PCI Master controller that is capable of asserting ownership of the PCI bus during PCI Master cycles.

The microprocessor 12 shown in FIG. 1 may comprise a model 80486 microprocessor, and the CPU local bus 14 could comprise an 80486-style local bus. The CPU local bus 14 includes a set of data lines D[31:0], a set of address lines A[31:0], and a set of control lines (not specifically shown). Details regarding the various bus cycles and protocols of the 80486 CPU local bus 14 are not discussed in detail herein, as they are well known by those in the art, and are available in numerous publications. CPU 12, memory controller 16 and PCI bus bridge 22 have traditionally been fabricated on separate integrated circuit chips. A recent trend in computer systems has developed, however, in which the CPU core is combined with a variety of peripheral devices on a single integrated processor chip. An exemplary integrated processor chip includes a bus bridge that provides a high performance interface between an internal CPU local bus and an external PCI bus. By providing a high performance interface to an external PCI bus, relatively high performance characteristics can be achieved with respect to external data transfers.

The PCI bus bridge 22 provides a standard interface between the CPU local bus 14 and the PCI bus 20. As such, the PCI bus bridge 32 orchestrates the transfer of data, address, and control signals between the two buses. PCI bus 20 typically comprises a high performance peripheral bus that includes multiplexed data/address lines, and which supports burst-mode data transfers.

The burst mode feature allows reads or writes to consecutive memory locations at high speed, via burst cycles on the PCI bus. The normal procedure for reading or writing from memory is that the CPU in a first clock cycle generates the address signals on the address bus, and then in the following clock cycle, data is transferred to or from system memory 17. Since the data bus is 32-bits wide, a total of four 8-bit bytes of data can be read or written by the CPU for every two clock cycles. Each set of four 8-bit bytes transferred on the data bus is referred to as a "double word." In burst mode or page mode cycles, additional sequential double words may be transferred during subsequent clock cycles without intervening address phases. For example, a total of four double words can be read into the CPU using only five clock cycles because only the starting address is sent out on the address bus, and subsequently the first double word of data is read during the second cycle, the next double word of data during the third cycle, and so on. Burst mode operation thereby accommodates relatively high data transfer rates.

As noted, the PCI peripheral device 28 may comprise a PCI Master controller. In accordance with conventional techniques, the PCI Master may request "ownership" of the PCI bus, so that it can control transactions on the PCI bus 20. As one skilled in the art will understand, a plurality of PCI Masters may be included in the computer system, any of which may request ownership of the PCI bus 20. The PCI Master submits its request for ownership of the PCI bus 20 to the PCI bridge 22 on a control line in the PCI bus 20. The PCI bus bridge 22 typically arbitrates ownership requests among the various PCI Masters, and among the internal masters such as the CPU 12, and other internal masters. Typically, a priority ranking is assigned to each of the various Masters to assist the bus bridge 22 in its priority determination.

The system memory typically includes banks of dynamic random access memory (DRAM) circuits. The DRAM connects to the MCU via a memory bus, comprised of memory address lines, memory data lines, and various control lines. The DRAM banks, according to normal convention, comprises the working memory of the integrated processor. Data generally is transferred between DRAM 17 and other components in a computer system in two steps. First, the accessing component generates signals on the address bus representing the row address of the desired memory location, which are latched into the DRAM when the row address strobe (RAS) signal is asserted low. At the next, or at subsequent, clock cycles, the memory device latches in the column address signal when the column address strobe (CAS) is asserted low. During an early write transaction, data is written into memory on the falling edge of the CAS signal while $\overline{WE}$ is active. In a read cycle, data from the selected memory cell is driven onto the data output line shortly after the assertion of the CAS signal while $\overline{WE}$ is inactive.

The speed of memory circuits is based upon two timing parameters. The first parameter is memory access time, which is the minimum time required by the memory circuit to set up a memory address and produce or capture data on or from the data bus. The second parameter is the memory cycle time, which is the minimum time required between two consecutive accesses to the memory circuit. For DRAM circuits, the cycle time typically is approximately twice the access time. DRAM circuits generally have an access time in the approximate range of 60–100 nanoseconds, with cycle times of 120–200 nanoseconds. The extra time required for consecutive memory accesses in a DRAM circuit is necessary because the internal memory circuits require additional time to recharge (or "precharge") to accurately produce data signals. Thus, a microprocessor running at 10 Mhz cannot execute two memory accesses, in immediate succession (or in adjacent clock pulses), to the same 100 nanosecond DRAM chip, despite the fact that a clock pulse in such a microprocessor is generated every 100 nanoseconds. DRAM chips require time to stabilize before the next address in that chip can be accessed. Consequently, in such a situation the microprocessor must execute one or more loop cycles or wait states before it can again access data in the DRAM circuit. Typically, a memory controller unit ("MCU") is provided as part of the computer system to regulate accesses to the DRAM main memory.

Because of these limitations, memory constructed with DRAM circuits is not always capable of responding to memory accesses within the time interval allotted by the CPU. In this event, external circuitry must signal to the CPU that supplementary processor cycles, or wait states, are necessary before the data is ready on the data bus, or before data from the data bus has been stored by the memory circuits. In addition to slowing the processing of the CPU, wait states generally require use of the CPU local bus, thereby limiting access to the bus by other system circuitry.

The critical timing parameters of memory transactions is shown in FIGS. 3A and 3B. As shown generally in FIGS. 3A (read cycle) and 3B (early write cycle), the row address is driven on the address inputs of the DRAM memory when the RAS (row address strobe) control line is asserted (i.e. RAS is driven low). This clocks the row address into an internal row address latch. The row address must be stable for a period ($t_{ASR}$) before RAS is asserted, and for a period ($t_{RAH}$) after RAS is asserted. A typical time for $t_{RAH}$ is 15 nanoseconds. The address inputs then are changed to the column address, and CAS (column address strobe) is asserted (CAS is driven low). The column address set-up time ($t_{ASC}$) is the minimum period by which the data on the column address must precede the assertion of CAS. The column address must remain stable for a period ($t_{CAC}$) after RAS is asserted. A typical time period for $t_{CAC}$ is 35 nanoseconds. The CAS signal also functions as the output enable, so that whenever CAS is asserted, the three-state driver on the data pin out is enabled. The time when CAS can be asserted is determined by the minimum RAS-to-CAS delay period ($t_{RCD}$).

The data is available after the access times from RAS (which is denoted as $t_{RAC}$) and CAS (which is denoted as $t_{CAC}$) have both been met. The limit of performance is determined by the access time from RAS ($t_{RAC}$). Another timing parameter that is critical to memory accesses is the RAS precharge time ($t_{RP}$). The precharge time ($t_{RP}$) is the time required for the DRAM circuit to recover from the previous access. Another cycle cannot be started the instant that data is available. Thus, the cycle time for dynamic memories is greater than the access time. The difference between the access time and the cycle time is the precharge time. These timing characteristics of DRAM circuits become critical as one attempts to expedite memory transactions.

Each of the various steps in the memory transaction (i.e. driving the row address, the assertion of RAS, driving the column address, and the assertion of CAS) require minimum time periods as defined by FIGS. 3A and 3B. When configuring the system, the designer or user must determine when the control signals (such as RAS and CAS) will be asserted during a memory transaction and when the address signal will be switched from the row address to the column address. Typically, in prior art devices, some or all of the signals defining the memory transaction are synchronized with the system clock. Thus, as an illustration, RAS may be asserted at the rising edge of the system clock, the row address would be switched to the column address on the following rising clock edge, and CAS may be asserted at the subsequent rising edge of the system clock.

One apparent problem with this timing and synchronization of the memory control signals with the system clock is that if the memory control unit is unable to generate or assert the signals at the next rising edge of the system clock, then the memory control unit must wait until the next rising clock edge to assert the signal. Thus, for example in a local bus operating at 33 MHz (defining a clock period of 30 nanoseconds), if the MCU is incapable of asserting the CAS strobe signal on the clock rising edge following the selection of the column address, then the MCU would be required to wait until the next rising clock edge, which would not occur until 30 nanoseconds later. Waiting another 30 nanoseconds in a DRAM circuit with access times of 60 nanoseconds represents a large percentage of the access time that has been lost because of the inability to generate the CAS signal prior to the next rising edge of the system clock.

Another problem which further complicates the configuration of the timing parameters in a DRAM transaction is that in prior art designs, the timing of the control signals is predetermined during the design of the MCU. Unfortunately, this determination often is made before the designer knows what the actual propagation delay will be for the MCU logic and the integrated processor. If the designer subsequently learns that enough time has not been allotted to complete the critical timing requirements of a DRAM memory transaction, the timing may need to be reconfigured, which may mean accepting a large amount of delay (i.e., another clock cycle) to accommodate the critical timing parameters of the DRAM.

To date, none of the prior art MCU and\or integrated processor designs have provided a solution to these problems. As the operating speed of processors increases and as new generations of processors evolve, it will be advantageous to minimize the wait states and delays, such as those caused by the critical timing parameters of the DRAM, to fully exploit the capabilities of these new processors.

SUMMARY OF THE INVENTION

The present invention solves the shortcomings and deficiencies of the prior art by providing a memory control unit that can be programmed to select minimum delay periods for the critical timing parameters required for a memory transaction to dynamic random access memory (DRAM). Where the prior art required delay periods of the remainder of the system clock cycle, the available delay periods in the present invention are defined by fractions of the system clock cycle to provide increased resolution. In the preferred embodiment, these delay periods are implemented by using a memory clock (MemClk) signal which operates at a multiple of the system clock (SysClk) signal. In addition, both the rising and falling edge of the memory clock (MemClk) signal is used to provide twice as many edges on which to synchronize the delayed signal. As a result, the delay periods are available with much greater resolution than is available in existing designs.

The present invention comprises an integrated processor that includes a memory control unit (MCU) which generates additional clock edges that can be used to synchronize delayed address and control signals, without requiring delays of a full system clock cycle. The memory control unit includes a DRAM edge generator circuit which receives as a clock signal a memory clock (MemClk) signal operating at twice (2×) the frequency of the system clock (SysClk) signal. In addition, the DRAM edge generator is responsive to both the rising and falling edges of the MemClk signal to provide four possible edges in a single system clock cycle, thereby increasing the resolution of the delayed signal fourfold.

The MCU of the present invention is programmable to permit a user to identify expected delays in the assertion of critical timing signals defining a memory transaction to DRAM, such as RAS and CAS, and to program the MCU to operate with the least possible delay for these signals (which can be as small as ¼ of the system clock).

The memory control unit connects to a CPU core and to other integrated processor components via a CPU local bus system. The memory controller unit includes a bus arbiter for receiving the ADS signal denoting a local bus cycle, and an address decoder for determining if an address request is made to DRAM. A DRAM router receives the address signal from the local bus and routes the address to a DRAM multiplexer. The DRAM router also provides a Bank select signal and a Byte select to the DRAM edge generator to identify which RAS and CAS lines to assert.

The MCU also includes a bank precharge counter which is enabled by the DRAM controller. The bank precharge counter provides an indication to the DRAM edge generator of the start of a precharge cycle and the end of the cycle, from which the DRAM edge generator determines if the transaction is a lead-off cycle, or a cycle after the DRAM page has been opened already (i.e., a burst mode).

The MCU preferably includes a configuration control logic which includes one or more configuration registers to control the delay periods for the RAS, CAS and multiplexer select signals. The configuration registers are configured by the BIOS. The DRAM controller includes a state machine which determines when the enable signals are sent to the edge generator.

The address multiplexer receives the address signals from the address router and first transmits the row address signal, followed by the column address signal. The time at which the column address is selected is determined by a signal from the edge generator.

The DRAM edge generator includes several delay circuits to control the delay period for various control signals, including RAS, CAS, and the row/column select input signal to the address multiplexer. The delay circuits receive as input signals the appropriate bits from configuration registers in the configuration control logic to define the delay period. These input signals then are compared with output signals from shifter circuits included as part of the delay circuit. The shifter circuit outputs and the configuration input signals are differentiated as even and odd signals. The configuration input signals are classified as even or odd based upon the status of the least significant bit, while the shifter circuits are classified by whether the output signal is produced by a rising clock edge or falling clock edge.

BRIEF DESCRIPTION OF THE DRAWINGS

For a more detailed description of the preferred embodiment of the present invention, reference will now be made to the accompanying drawings, wherein:

FIG. 2 depicts a functional block diagram of the memory control unit constructed in accordance with the preferred embodiment;

Figure 1:
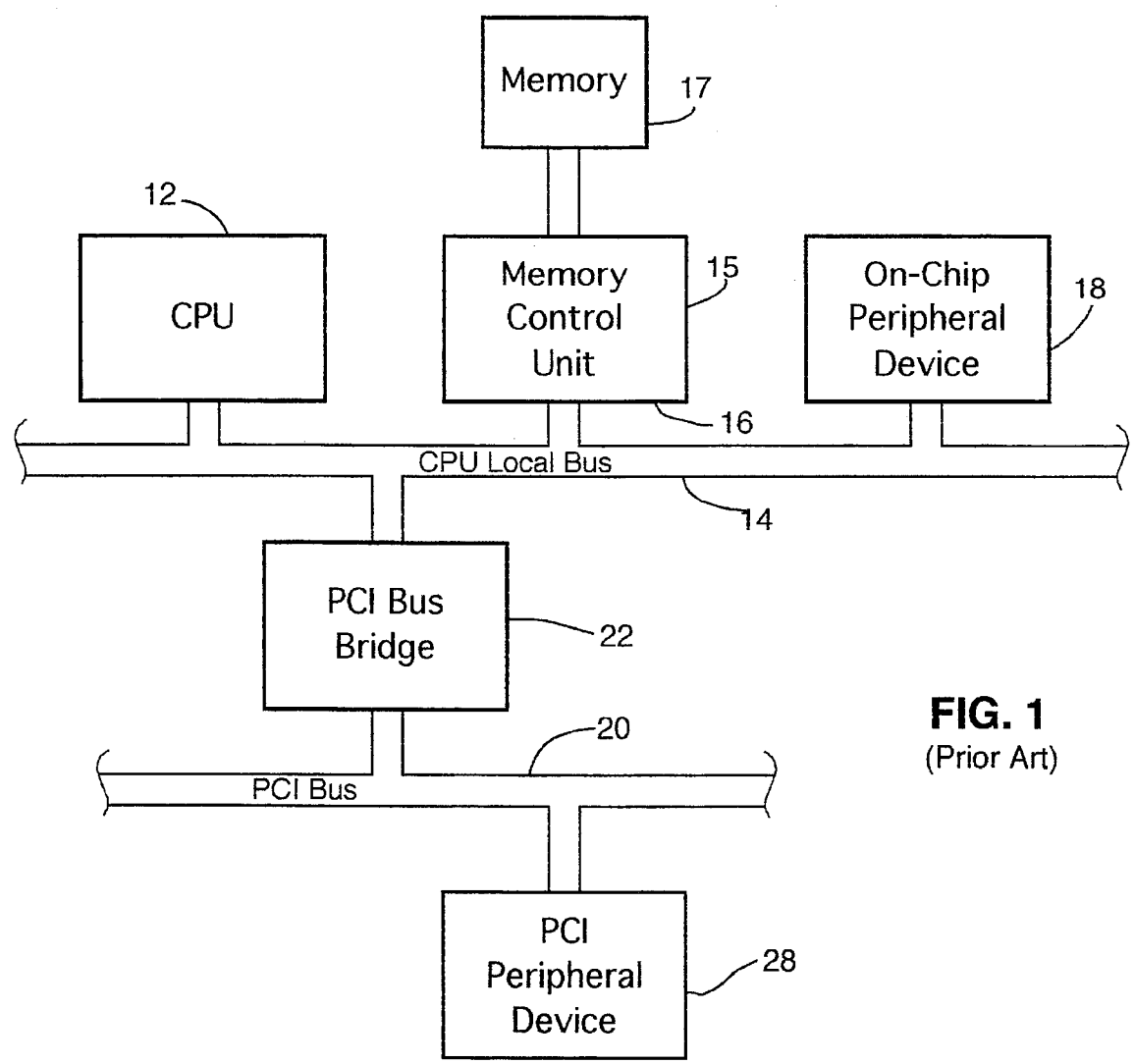
FIG. 1 depicts a functional block diagram of a prior art computer system that supports a PCI Master device.
Figure 3A:
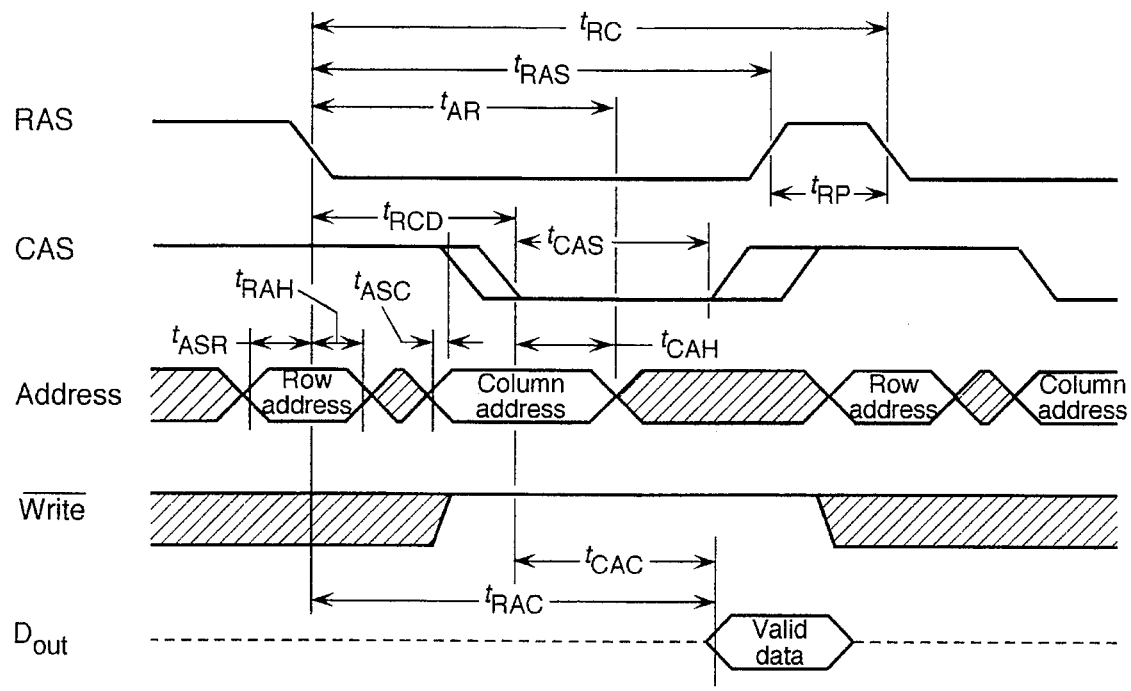
FIGS. 3A-3B show timing diagrams of typical read and write cycles, respectively, for a DRAM transaction.
Figure 3B:
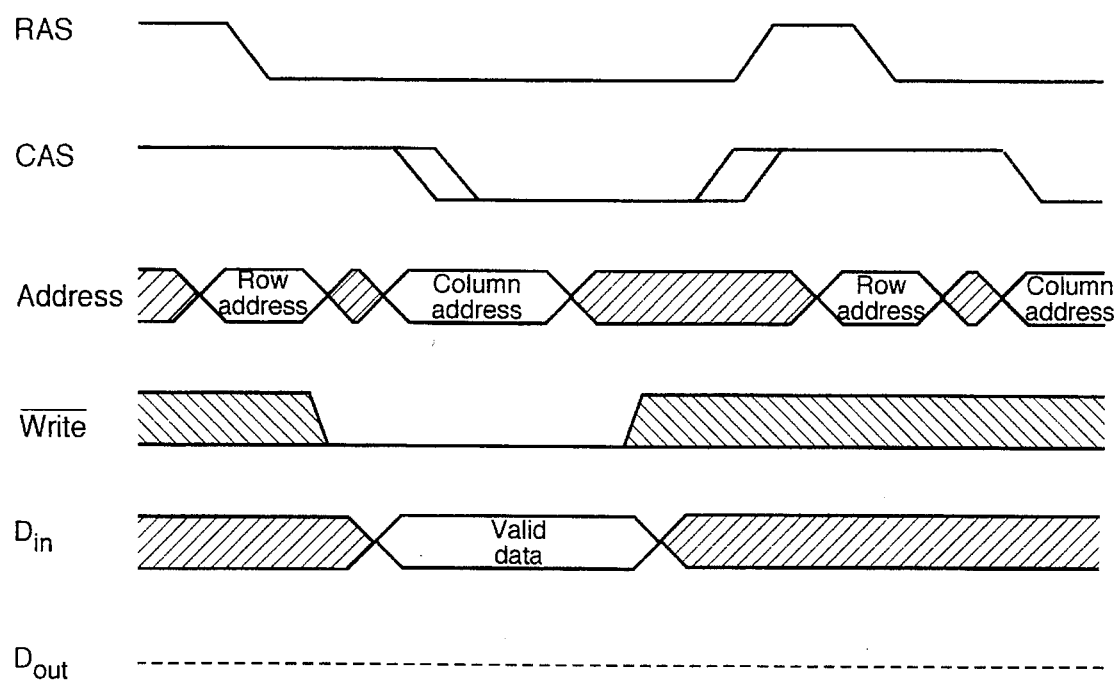

While the invention is susceptible to various modifications and alternative forms, specific embodiments thereof are shown by way of example in the drawings and will be described in detail herein. It should be understood, however, that the drawings and detailed description are not intended to limit the invention to the particular form disclosed. On the contrary, the intention is to cover all modifications, equivalents and alternatives falling within the spirit and scope of the present invention as defined by the appended claims.

DETAILED DESCRIPTION OF THE INVENTION

The following discussion focuses on the preferred construction of the memory control unit ("MCU") 100, which in the preferred embodiment forms part of an integrated processor, in accordance with the general design of FIG. 1. Additional details regarding the preferred integrated processor design may be found in commonly assigned U.S. application Ser. No. 08/190,647 entitled "High Performance Integrated Processor Architecture," the teachings of which are incorporated herein. Moreover, the following discussion regarding the MCU is focused on those components that relate to the operation of the programmable DRAM edge generator so as not to obscure the present invention. Other components may be provided as part of the MCU without departing from the present invention.

Figure 5:
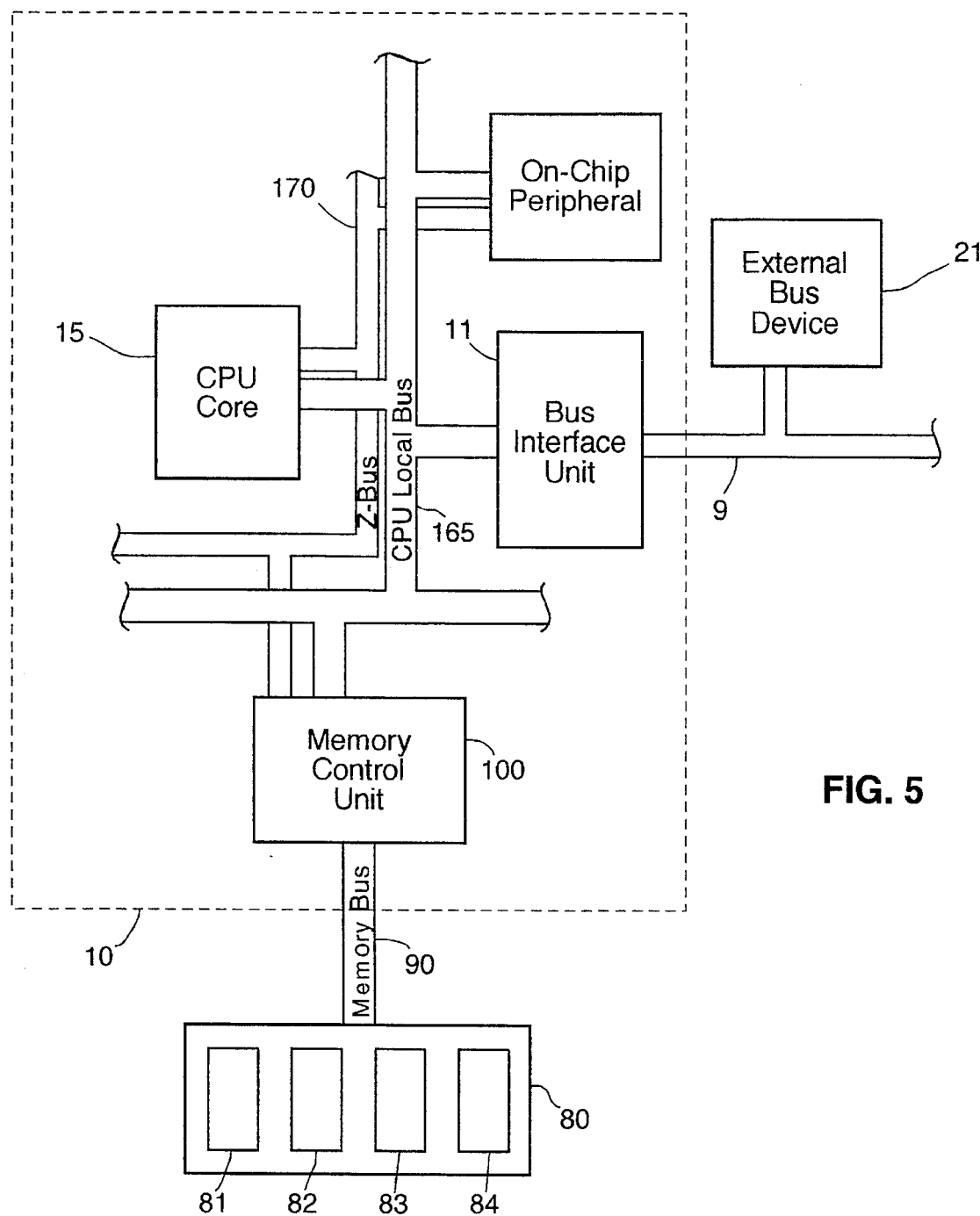
FIG. 5 depicts a general layout of the integrated processor constructed in accordance with the preferred embodiment.

In the preferred embodiment of FIG. 5, the MCU 100 is provided as part of an integrated processor 10, and couples to the CPU local bus 165 and/or to local internal buses, such as an 8-bit Z-bus 170. It should be understood, however, that the MCU 100 of the present invention could be located independently of the processor. In that case, the internal buses would be replaced by a suitable peripheral bus. In the preferred embodiment, the CPU core 15 implements a model 80486 microprocessor instruction set and the CPU local bus 165 comprises a model 80486-style local bus. Thus, in the preferred embodiment, the CPU local bus 165 includes a 32-bit set of data lines D(31:0), a 32-bit set of address lines A(31:0), and a set of control lines (not shown specifically). Once again, however, it should be understood that the CPU core could be configured to implement other microprocessor-type instruction sets without departing from the principles of the present invention.

The integrated processor 10 also preferably includes a bus interface unit 11 and an on chip peripheral device 13. The integrated processor preferably connects to one or more external devices 21 via external bus 9. In accordance with the preferred embodiment, the bus interface unit orchestrates the transfer of signals between the local bus 165 and the external bus 9.

The MCU 100 controls memory transactions to the DRAM memory array 80, which preferably is comprised of four banks of DRAM circuits, 81, 82, 83, 84. The MCU 100 connects to the DRAM memory array 80 via memory bus 90.

Referring now to FIGS. 2 and 5, the general configuration of the MCU 100 is shown in block diagram form connected to the CPU local bus 165 and to the 8-bit Z bus 170, in accordance with the preferred embodiment. The MCU 100 preferably comprises a unified control unit which supports a high performance address and data path to the DRAM array 80, as shown in FIG. 5. The MCU 100 controls access to the DRAM array 80 and connects to the CPU local bus 165 to provide a path to RAM for the CPU, and other peripheral components. The memory control unit 100 connects to the DRAM array through the memory bus 90.

As shown in FIGS. 2 and 5, the memory bus 90 preferably comprises the memory address lines MAddress (11:0), the memory data lines MData (31:0), and various control lines including RAS (3:0), CAS (3:0), and write enable $\overline{WE}$. The DRAM array 80 comprises the main working memory of the CPU 15, in accordance with normal convention. The DRAM array 80 preferably comprises DRAM circuits configured into a plurality of banks 81, 82, 83, 84, with each bank 32 bits (or 4 bytes) wide. In the preferred embodiment, the DRAM array accommodates as many as four 32-bit banks supporting up to 256 MB of RAM using Industry standard modules. As will be understood by one skilled in the art, each of the DRAM banks typically are sub-divided into "pages." The page size depends upon the size of the respective DRAM chips that are used. To enable the DRAM chips to operate with fewer connector pins, which decreases the number of chips that can be located on the system board, the DRAM chips are addressed in a multiplexed fashion; that is the address of each memory cell is transmitted in two parts. The first half of the address defines the row address and the second half defines the column address. In the preferred embodiment, the first twelve lines of the memory address bus MA(11:0) are multiplexed outputs and convey the row address location when row address strobe signals (RAS) are transmitted, and convey the column address location when column address strobe signals (CAS) are transmitted. An individual memory cell in RAM, therefore, is selected by a row address and a column address which are transmitted separately to the DRAM array.

Referring again to FIG. 2, the MCU 100 preferably includes an address decoder 30, an address router 60 and a DRAM multiplexer 70 (which forms part of a memory interface unit 65) for controlling the manner in which the address A(31:0) from the local bus 165 is provided on the memory address bus MAddress (11:0). The MCU also preferably includes a bus arbiter unit 35 for initiating memory transactions, and a CPU local bus interface 40 for controlling the transfer of data D(31:0) between the local bus 165 and the memory data bus MData(31:0). In addition, the MCU also preferably includes a DRAM controller 75 for orchestrating the operation of the MCU during a DRAM transaction, a bank precharge counter 55, a configuration control logic 45 and a DRAM edge generator 50.

The address decoder 30 preferably connects to the CPU local bus 165 to receive address signals and control signals such as read/write signals W/E, memory or I/O cycle status signals. The address decoder 30 also receives a system clock (SysClk) signal to control its timing. The address decoder 30 receives an input signal from the DRAM router indicating if a DRAM bank hit occurs, and in turn produces a MEMHIT output signal to the local bus 165, and a DRAM enable signal to the bus arbiter 35. The address decoder also produces an output signal to the memory interface unit 65 to control the write enable $\overline{WE}$ control signal.

In accordance with the preferred embodiment, the DRAM address router 60 couples to the address lines A(31:0) of the CPU local bus 165 and provides row and column address signals to the DRAM multiplexer 70. The DRAM address router 60 also provides as an output signal to the DRAM edge generator 50 a bank select signal and a byte select signal to indicate to the edge generator 50 which row address strobe (RAS) line RAS(3:0) and which column address strobe (CAS) line CAS(3:0) to assert to complete the memory transaction.

The DRAM multiplexer 70 preferably receives the row and column addresses from the address router 60 and multiplexes these addresses to first provide the row address on the memory address lines MAddress (11:0), and then to provide the column address on the same memory address lines. The selection and timing of the column address is determined by an input signal received from the DRAM edge generator 50.

The bus arbiter 35 receives an ADS signal from the CPU local bus 165 to indicate the beginning of a cycle. In addition, the bus arbiter 35 preferably receives a signal from the DRAM router 60 indicating whether the next memory access is on the same bank or page as the previous access. The bank and page information preferably are transmitted by the bus arbiter 35 to the DRAM controller 75 as part of a DRAM bus request.

The CPU local bus interface 40 connects to the CPU local bus 165 to receive and transmit data signals D(31:0) to and from the CPU local bus 165. Similarly, the local bus interface 40 preferably connects to the memory data bus MDATA(31:0) through a separate data buffer 68 to transmit and receive data signals to and from the DRAM array. The direction in which the data signals are driven preferably is controlled by a read/write (R/W) control signal from the address decoder 30. The local bus interface 40 preferably is enabled by control signals from the DRAM controller 75. As one skilled in the art will understand, the local bus interface 40 and the data control buffer 68 may be constructed as a single unit, if desired.

Referring still to FIG. 2, the DRAM controller 75 preferably receives control signals from the bus arbiter 35 to indicate that a data transaction to DRAM is requested. After receiving the control signals from the bus arbiter 35, the DRAM controller generates a ready RDY signal to the CPU local bus interface 40 and an enable signal to the DRAM edge generator 50. The DRAM controller 75 also receives an end precharge signal from the bank precharge circuit 55.

The bank precharge counter 55 preferably comprises a down counter, clocked by the system clock (SysClk) signal, which determines the precharge period. The bank precharge circuit 55 receives shifter enable output signals from the DRAM controller 75 and begins the count down. In the preferred embodiment, the precharge period is determined by the configuration registers 71, 72 (depending upon whether a RAS precharge or a CAS precharge is occurring). At the beginning of the count, the bank precharge circuit 55 also provides an output signal to the DRAM edge generator 50 to indicate the start of a precharge period to indicate to the DRAM edge generator 50 that the previous memory transaction is complete. At the completion of the count, a signal is transmitted to the DRAM controller 75 to indicate that the DRAM circuit cycle time has been met and the next transaction can begin.

Each of the above identified components of the MCU 100 are clocked with the system clock (SysClk) signal. The DRAM edge generator 50, however, preferably is clocked with a MemClk signal that operates at a frequency which is a multiple of the SysClk signal. In the preferred embodiment, the MemClk operates at twice the frequency of the SysClk signal. In addition, both edges of the MemClk signal are used by the DRAM edge generator 50 to effectively provide a four-fold increase in resolution.

The configuration control logic 45 preferably includes several configuration registers 71, 72, 73. The values in these configuration registers preferably are established during system initialization by the basic input/output system (BIOS). In the preferred embodiment, register 71 is identified as DCR1, with an index of 60 H. Register 71, therefore, comprises an eight bit register, with bits 0–2 dedicated for indicating the desired RAS start delay, preferably as follows:

TABLE I

DCR1 (60H)

| Bit2 | Bit1 | Bit0 | RAS Delay period (measured from mid T1) |
|---|---|---|---|
| 0 | 0 | 0 | 0 delay |
| 0 | 0 | 1 | 0.5 MemClk cycle delay (0.25 SysClk) |
| 0 | 1 | 0 | 1.0 MemClk cycle delay (0.5 Sysclk) |
| 0 | 1 | 1 | 1.5 MemClk cycle delay (0.75 SysClk) |
| 1 | 0 | 0 | 2.0 MemClk cycle delay (1.0 SysClk) |

As one skilled in the art will understand, additional delays could also be programmed into the DCR1 register 71, if desired.

In accordance with the preferred embodiment, bits 3–5 of the DCR1 register 71 preferably are dedicated to indicate the desired row-to-column multiplexer (mux) delay, preferably as follows:

TABLE II

DCR1 (60H)

| Bit5 | Bit4 | Bit3 | Row Column Mux Delay (measured from mid T1) |
|---|---|---|---|
| 0 | 0 | 0 | 0.5 MemClk cycle delay |
| 0 | 0 | 1 | 1.0 MemClk cycle delay |
| 0 | 1 | 0 | 1.5 MemClk cycle delay |
| 0 | 1 | 1 | 2.0 MemClk cycle delay |
| 1 | 0 | 0 | 2.5 MemClk cycle delay |
| 1 | 0 | 1 | 3.0 MemClk cycle delay |
| 1 | 1 | 0 | 3.5 MemClk cycle delay |

Bits 6 and 7 of the DCR1 register 71 preferably define the RAS precharge cycle, as measured from the end of the previous T2 cycle, in multiples of the SysClk signal.

Register 72 preferably is identified as DCR2, with an index of 61 H, and thus comprises an eight-bit register with bits 0–2 dedicated to provide the CAS delay during Read cycles. In the preferred embodiment, the available programmed delay states and periods available in the DCR2 register 72 comprise:

TABLE III

DCR2 (61H)

| Bit2 | Bit1 | Bit0 | Read CAS Delay (measured from mid T1) |
|---|---|---|---|
| 0 | 0 | 0 | 1.0 MemClk cycle delay |
| 0 | 0 | 1 | 1.5 MemClk cycle delay |
| 0 | 1 | 0 | 2.0 MemClk cycle delay |
| 0 | 1 | 1 | 2.5 MemClk cycle delay |
| 1 | 0 | 0 | 3.0 MemClk cycle delay |
| 1 | 0 | 1 | 3.5 MemClk cycle delay |

Bits 3 and 4 of the DCR2 register 72 preferably define the Read CAS precharge pulse duration, measured from the end of the previous T2 cycle, in the rising and falling edges of the MemClk cycle.

TABLE IV

DCR2 (61H)

| Bit4 | Bit3 | Read CAS Precharge Pulse Duration |
|---|---|---|
| 0 | 0 | 0.5 MemClk delay (0.25 SysClk) |
| 0 | 1 | 1.0 MemClk |
| 1 | 0 | 1.5 MemClk |
| 1 | 1 | 2.0 MemClk |

In the preferred embodiment, register 73 is identified as DCR3, with an index of 62 H. Register 73 preferably comprises an eight bit register, with bits 0–2 dedicated to provide the delay period for CAS signals during Write cycles. In the preferred embodiment, the following delay periods are available in the DCR3 register 73:

TABLE V

DCR3 (62H)

| Bit2 | Bit1 | Bit0 | Write CAS Delay (measured from end of T1 if lead-off, or beginning of T2 if in page mode) |
|---|---|---|---|
| 0 | 0 | 0 | 0.5 MemClk cycle delay |
| 0 | 0 | 1 | 1.0 MemClk cycle delay |
| 0 | 1 | 0 | 1.5 MemClk cycle delay |
| 0 | 1 | 1 | 2.0 MemClk cycle delay |
| 1 | 0 | 0 | 2.5 MemClk cycle delay |
| 1 | 0 | 1 | 3.0 MemClk cycle delay |

Referring still to FIG. 2, the DRAM edge generator 50 preferably receives signals indicative of the contents of configuration registers 71, 72, 73 to establish the timing delays of the RAS, Mux, and CAS signals, as predetermined by the system BIOS. The DRAM edge generator 50 also receives shifter enable signals from the DRAM controller 75, a start precharge signal from the bank precharge counter 55, and bank and byte selects from the DRAM address router 60. In response to receipt of these signals, and after appropriate delays as defined by the configuration registers 71, 72, 73, the DRAM edge generator 50 asserts the RAS output RAS(3:0) signals and the CAS output CAS(3:0) signals which are provided as control signals to the DRAM array to enable the memory transaction. The DRAM generator also provides the row-to-column select signal to the DRAM multiplexer 70 to switch the multiplexer output from the row address to the column address.

In accordance with customary techniques, the row address strobe (RAS) lines (RAS3#-RAS0#) preferably comprise active low outputs that are used by the DRAM array to clock in row address data from the memory address bus MAD-DRESS(11:0) for each DRAM bank. In the preferred embodiment, one RAS line is dedicated to each bank. Four RAS lines are provided in the preferred embodiment where four RAM banks are used. Similarly, four column address strobe (CAS) lines (CAS3#-CAS0#) are provided as active low outputs that are used by the DRAM array to clock in column address data from the memory address bus MAD-DRESS(11:0) for each byte of the DRAM bytes, one CAS per byte. Thus, for example, CAS3# is the DRAM column address strobe for byte 3 in each DRAM bank.

Figure 4A:
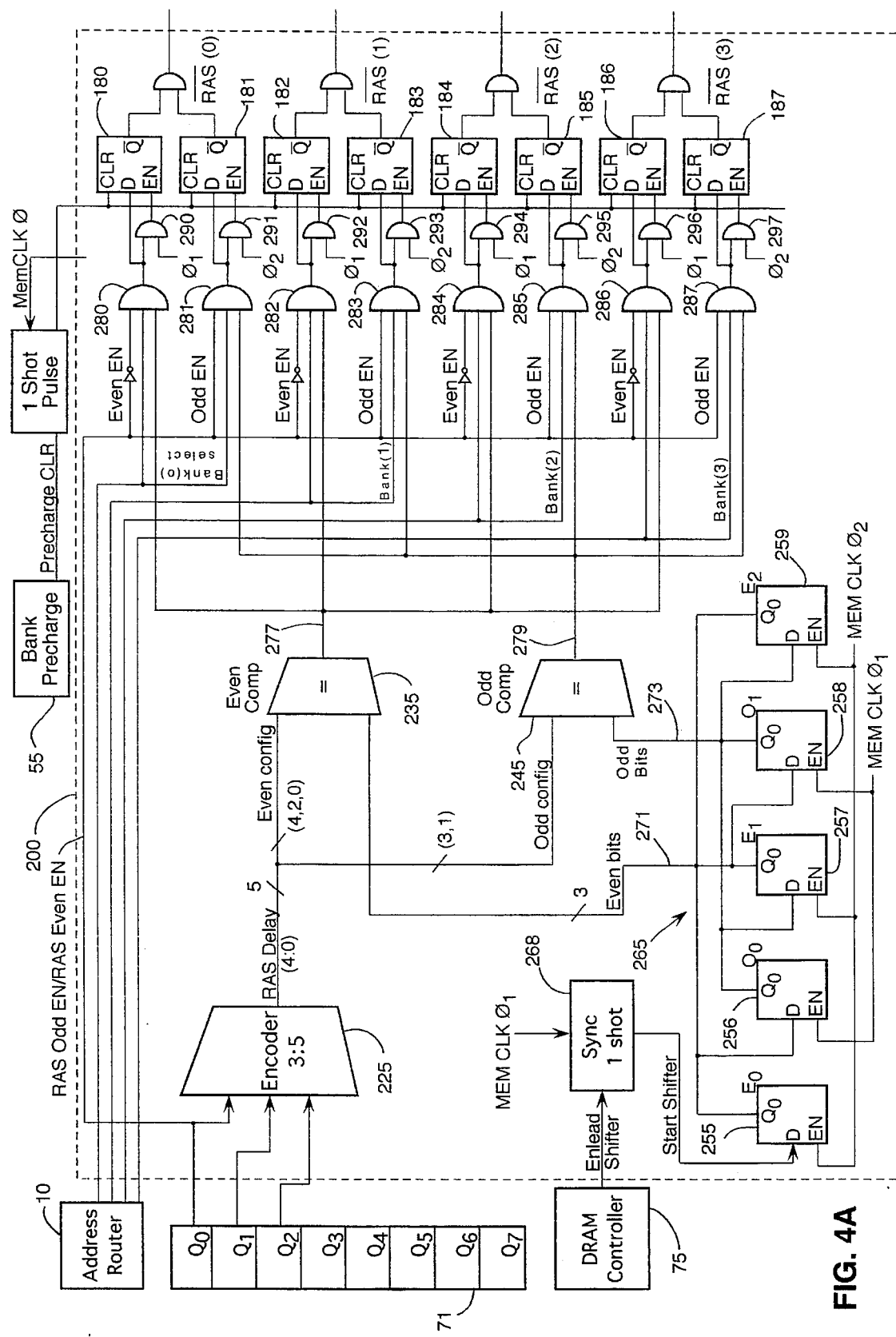
FIGS. 4A-4C illustrate the preferred construction of the delay circuits comprising the DRAM edge generator.
Figure 4B:
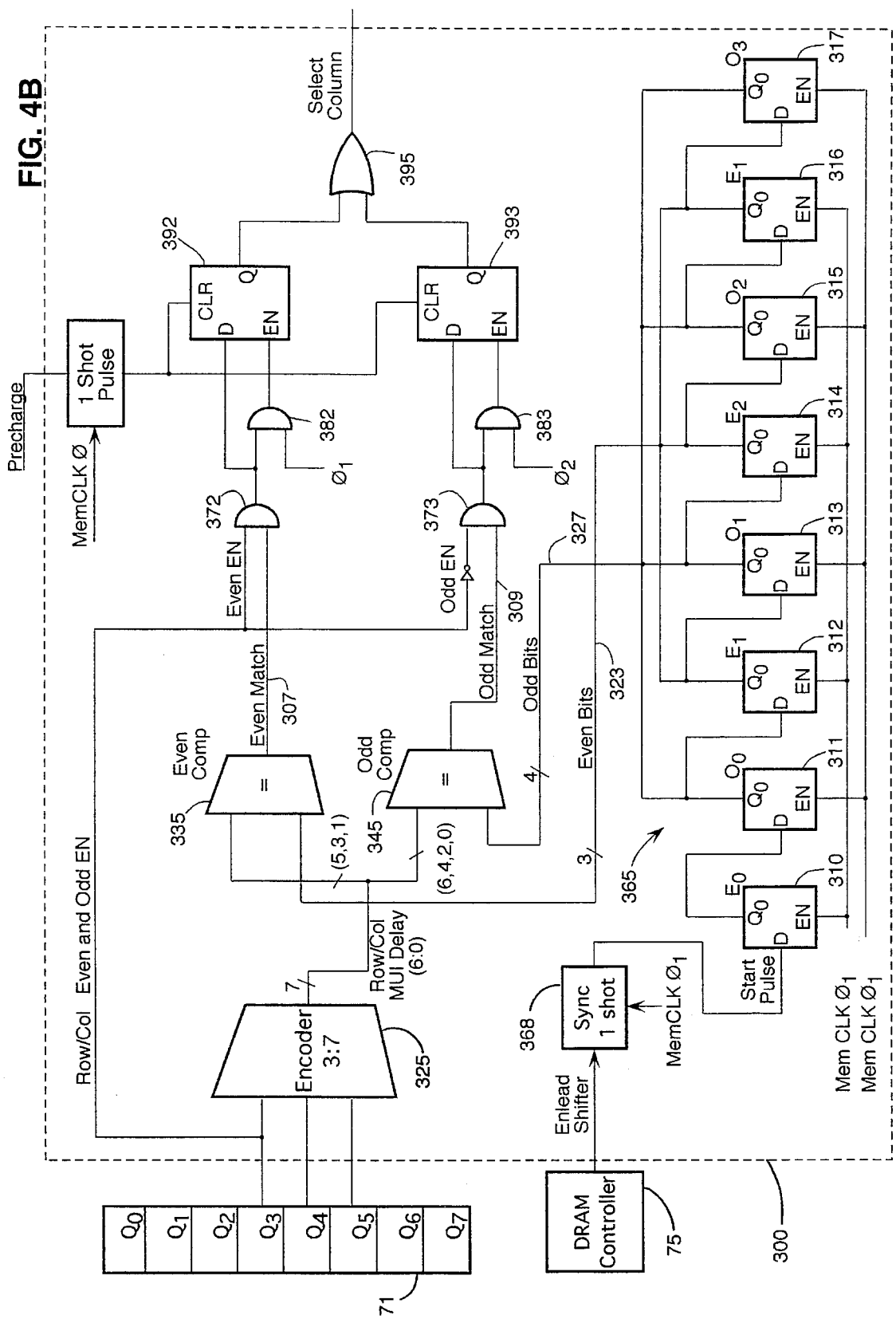
Figure 4C:
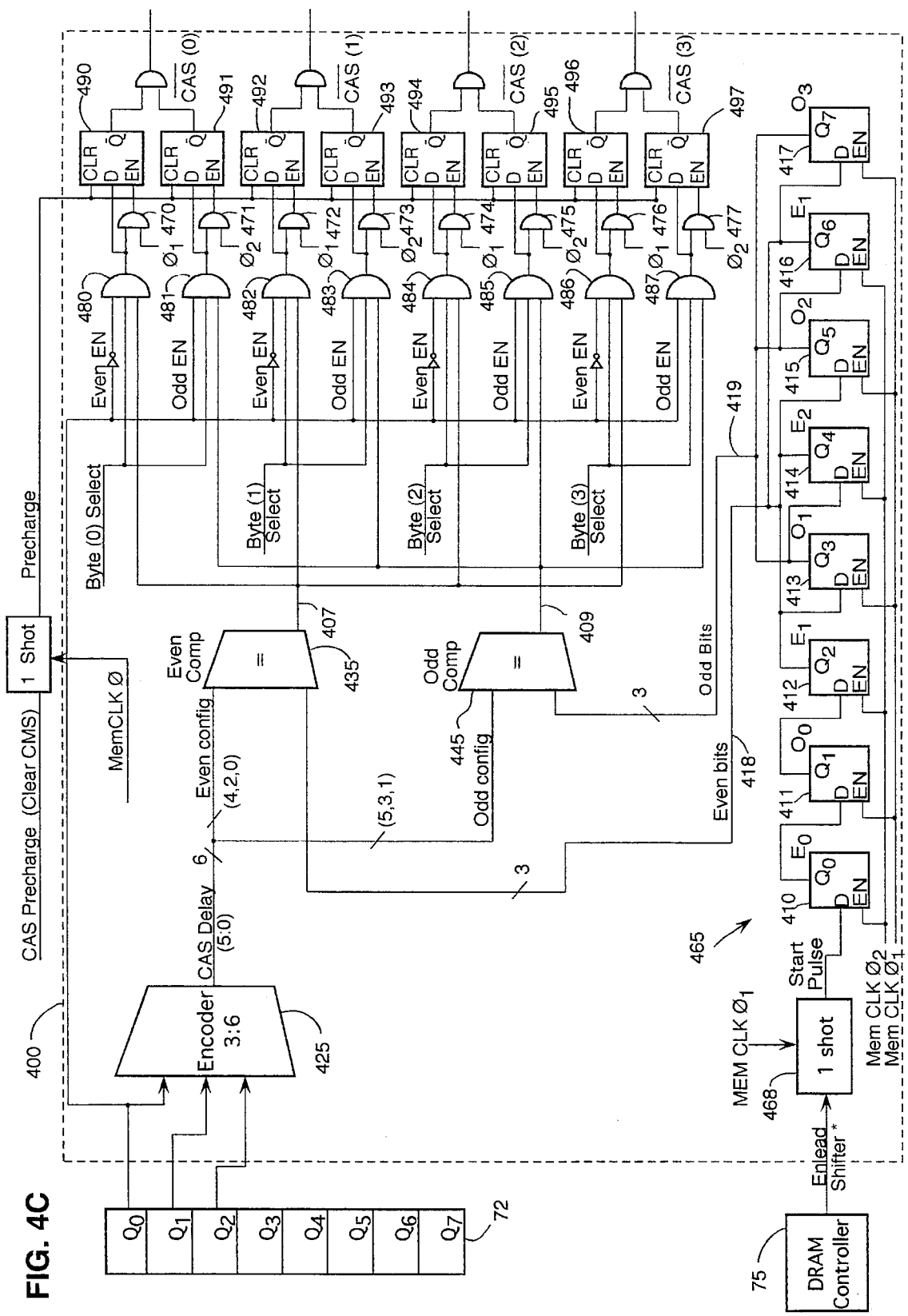

The preferred construction of the DRAM edge generator 50 now will be described with reference to FIGS. 4A, 4B and 4C. FIG. 4A illustrates the preferred construction of a RAS shifter circuit 200 to provide the RAS control signal at the desired delay period. FIG. 4B similarly illustrates the preferred construction of the row-to-column mux shifter circuit 300 to provide the multiplexer switch signal at the desired delay time, and FIG. 4C shows the preferred construction of the CAS shifter circuitry 400.

The timing of the DRAM edge generator 50 preferably is referenced with respect to certain cycles in the memory transaction, and thus a rudimentary understanding of a memory cycle is required. When the MCU 100 receives the ADS signal, the MCU 100 decodes the address on the local bus 165. If the address is to a valid memory address, the MCU 100 issues a MEMHIT signal and starts a bus cycle referred to as T1 at the rising edge of the system clock SysClk. If the request points to a valid memory location, the MCU preferably starts the memory transfer by the end of the T1 cycle. Various wait states may be required during the memory transaction. These wait states are designated as $T_w$. The memory transaction is completed during the cycle referred to as T2. Data becomes available during T2, and is latched in at the end of the T2 cycle.

Referring now to FIG. 4A, the RAS shifter circuit 200 preferably receives the bank select (3:0) from the address router 60 to indicate the bank of the DRAM array to be accessed in the memory transaction. In addition, bits 0–2 of the DCR1 register 71 are received to indicate the desired delay timing for the RAS signal. In addition, the shifter enable signal from the DRAM controller 75 is provided as an input signal to shifter circuit 200. Finally, the precharge signal is received from the bank precharge circuit 55 to indicate that the previous transaction is complete.

Referring still to FIG. 4A, the RAS delay shifter circuit 200 preferably comprises a 3:5 encoder 225, two digital comparators 235, 245, a plurality of pipelined latches 255, 256, 257, 258, 259, comprising a digital shifter 265 and eight output latches 180, 181, 182, 183, 184, 185, 186, 187. In accordance with the preferred embodiment of FIG. 4A, the various latches are clocked by the memory clock (MemClk) signal. The high phase (or high level) of MemClk is denoted as $\phi_1$, while the low phase (or low level) of MemClk is denoted as $\phi_2$.

Referring still to FIG. 4A, the encoder 225 preferably receives bits $Q_0$–$Q_2$ from the DCR1 register 71, which represent the desired RAS delay as configured by the system BIOS. In response to this input from register 71, the encoder 225 preferably produces the following encoded signals:

TABLE VI

| DCR1 | | | ENCODER | | | | | DELAY FROM |
|---|---|---|---|---|---|---|---|---|
| $Q_2$ | $Q_1$ | $Q_0$ | Bit4 | Bit3 | Bit2 | Bit1 | Bit0 | MID T1 |
| 0 | 0 | 0 | 0 | 0 | 0 | 0 | 1 | 0 delay |
| 0 | 0 | 1 | 0 | 0 | 0 | 1 | 0 | 0.5 MemClk |
| 0 | 1 | 0 | 0 | 0 | 1 | 0 | 0 | 1.0 MemClk |
| 0 | 1 | 1 | 0 | 1 | 0 | 0 | 0 | 1.5 MemClk |
| 1 | 0 | 0 | 1 | 0 | 0 | 0 | 0 | 2.0 MemClk |

Thus, the output line of encoder 225, which is shown in FIG. 4A as a five line output, RAS Delay (4:0), produces a shifted signal that is generated in response to the DCR1 status bits $Q_0$–$Q_2$. The even RAS delay lines, which represent Bit4, Bit2, and Bit0, are provided as input signals to the "even" comparator 235, while the odd RAS delay lines, which represent Bit3 and Bit1, are provided to the "odd" comparator 245. The second input to both the even comparator 235 and to the odd comparator 245 is generated by digital shifter 265.

The digital shifter 265 preferably includes a one shot multivibrator 268 and a plurality of cascaded D-style latches 255–259. The one shot multivibrator 268 is enabled by the shifter enable output signal from DRAM controller 75. The multivibrator 268 functions to synchronize this shifter enable signal into a start shifter data pulse to the first latch 255. Latch 255 preferably is enabled by the low level or low phase of the memory clock signal, during MemClk$\phi_2$, to produce an output signal $Q_0$. Latch 255 preferably is denoted as an even latch or low phase latch, so that the output signal $Q_0$ represents the least significant even bit $E_0$. The output signal $Q_0$ also is provided as the input signal to latch 256.

Latch 256 preferably is enabled by the high level or high phase of the memory clock signal, MemClk$\phi_1$, to produce an output signal $Q_1$. In accordance with the preferred embodiment, latch 256 represents an odd latch, or a high phase latch, so that the output $Q_1$ represents the least significant odd bit $O_0$. The output of latch 256 also is provided as the input signal to latch 257, which preferably comprises an even latch that is enabled from the low phase of the memory clock signal, during MemClk$\phi_2$, to produce even bit $E_1$.

Latch 258 preferably comprises an odd latch that is enabled from the high phase of the memory clock signal, during MemClk$\phi_1$ to produce odd bit $O_1$. Latch 258 receives as its input the output signal $Q_2$ from latch 257. The output signal from latch 258 $Q_3$ also is provided as the input to latch 259. Latch 259 preferably comprises an even latch and thus is enabled from the low phase of the memory clock signal, during MemClk$\phi_2$. The output of latch 259 $Q_4$ represents even bit $E_2$.

Thus, the outputs of latches 255, 257, 259 are provided as even bits $E_0$–$E_2$ on a three line bus 271 as the other input signal to even comparator 235. Similarly, the outputs of latches 256, 258 are provided as odd bits on a two line bus 273 as the other input signal to odd comparator 245.

Referring still to FIG. 4A, the even comparator 235 compares the even RAS delay bits (which comprise bit4, bit2 and bit0) with the even bits ($E_2$, $E_1$ and $E_0$) from digital shifter 265. If an exact match exists (i.e. bit4=$E_2$; bit2=$E_1$; and bit0=$E_0$) between the RAS delay bits and the even bits from digital shifter 265, comparator 235 produces an output pulse on output line 277. In similar fashion, the odd comparator 245 compares the odd RAS delay bits (which comprise bit3 and bit1) with the odd bits ($O_1$ and $O_0$) from digital shifter 265. If an exact match occurs, comparator 245 produces an output pulse on output line 279.

The output line 277, which represents the output of even comparator 235, preferably is provided as an input to AND gates 280, 282, 284, 286. Output line 279, which represents the output of odd comparator 245, is provided as an input to AND gates 281, 283, 285, 287. A second input (labelled as RAS odd enable/Ras even enable) to the AND gates 280–287 is provided from the output of bit $Q_0$ (the least significant bit) from the DCR1 register 71. This bit is used to select/enable one output of the comparators. As seen in TABLE I, if this bit is a "0" only the "even" delays are enabled (i.e., only the output of the "even" comparator is enabled). In AND gates 280, 282, 284, 286, this input is inverted, while in AND gates 281, 283, 285, 287 the input is provided directly to the AND gate. Thus, if bit $Q_0$ is a "0," only the inverted inputs to AND gates 280, 282, 284, 286 will be high. Conversely, if bit $Q_0$ is a "1," only the inputs to AND gates 281, 283, 285, 287 will be high. Thus, as will be understood by one skilled in the art, only the output of AND gates 280, 282, 284, 286 can go high if bit $Q_0$ is a "0," and only the output of AND gates 281, 283, 285, 287 can go high if bit $Q_0$ is a "1."

The third input to AND gates 280–287 is provided as the bank select output signal from DRAM address router 60. As shown in the preferred embodiment, the bank(0) select line is applied as an input to AND gates 280, 281; the bank(1) select line is provided as an input to AND gates 282, 283; the bank(2) select line is provided as an input AND gates 284, 285; and the bank(3) select line is provided as an input to AND gates 286, 287. Thus, as will be understood by one skilled in the art, only the outputs of AND gates 280, 281 can go high if bank(0) is selected, only the outputs of AND gates 282, 283 can go high if bank (1) is selected, and so forth for AND gates 284–287.

In accordance with normal convention, AND gates 280–287 only produce a high digital output (i.e. a "1") if all three inputs are high. As a result of this configuration, only one of the AND gates 280–287 can produce a high output if a match occurs between the RAS delay lines and the output of digital shifter 265. If no match occurs, none of the AND gates will produce a high output. The AND gates 280–287 will only produce a high output, therefore, if a match is found by the appropriate comparator 235, 245, the appropriate bank select line has been selected, and the least significant bit $Q_0$ is provided as a high input to the AND gate.

The output of AND gates is provided as a data input to a corresponding latch unit 180–187, and as an input to a corresponding AND gate 290–297. The other input to AND gates 290–297 comprises either MemClk$\phi_1$ or MemClk$\phi_2$. The output of AND gates 290–297 are provided as enable inputs to latches 180–187. The output of AND gates 290–297 only will go high if the corresponding output from AND gates 280–287 is high and the proper level of the memory clock cycle signal is present.

When both corresponding AND gates produce a high output signal, the associated latch will produce a low output signal at the Q(bar) output. This low output signal causes an output AND gate to go low, thereby asserting the appropriate RAS line.

Thus, as an example, if bits $Q_2$, $Q_1$, and $Q_0$ of register 71 comprise 010, the encoded signal from encoder 225 will produce an output of 00100. Bits 010 then are provided as input signals to comparator 235, and bits 00 are provided as input signals to comparator 245. The RAS odd enable/RAS even enable line will be low, reflecting the status of bit $Q_0$, and thus only AND gates 280, 282, 284, 286 will receive a high input from the enable line. If bank(1) has been selected, then only AND gates 282, 283 will receive a high input from the bank select line. As a result, only the output of AND gate 282 can go high. After the shifter enable signal is received from the DRAM controller, and after the pulse propagates through to latch 257, a match will occur at comparators 235, 245, resulting in an output pulse on lines 277, 279. A pulse on line 277 will cause the output of AND gate 282 to go high, producing a "1" at the input of latch 182. During the high level of the memory clock (MemClk$\phi_1$), AND gate 292 also will produce a high output, thereby enabling latch 182 to clock in the high input from AND gate 282, and producing a low output at the $\overline{Q}$ output. The low output from latch 182 then drives low the $\overline{RAS(1)}$ line, thereby asserting $\overline{RAS(1)}$ from the rising MemClk edge, with a delay of 1.0 MemClk from mid T1 (as dictated by bits $Q_2$–$Q_0$ of DCR1 register 71).

Figure 7A:
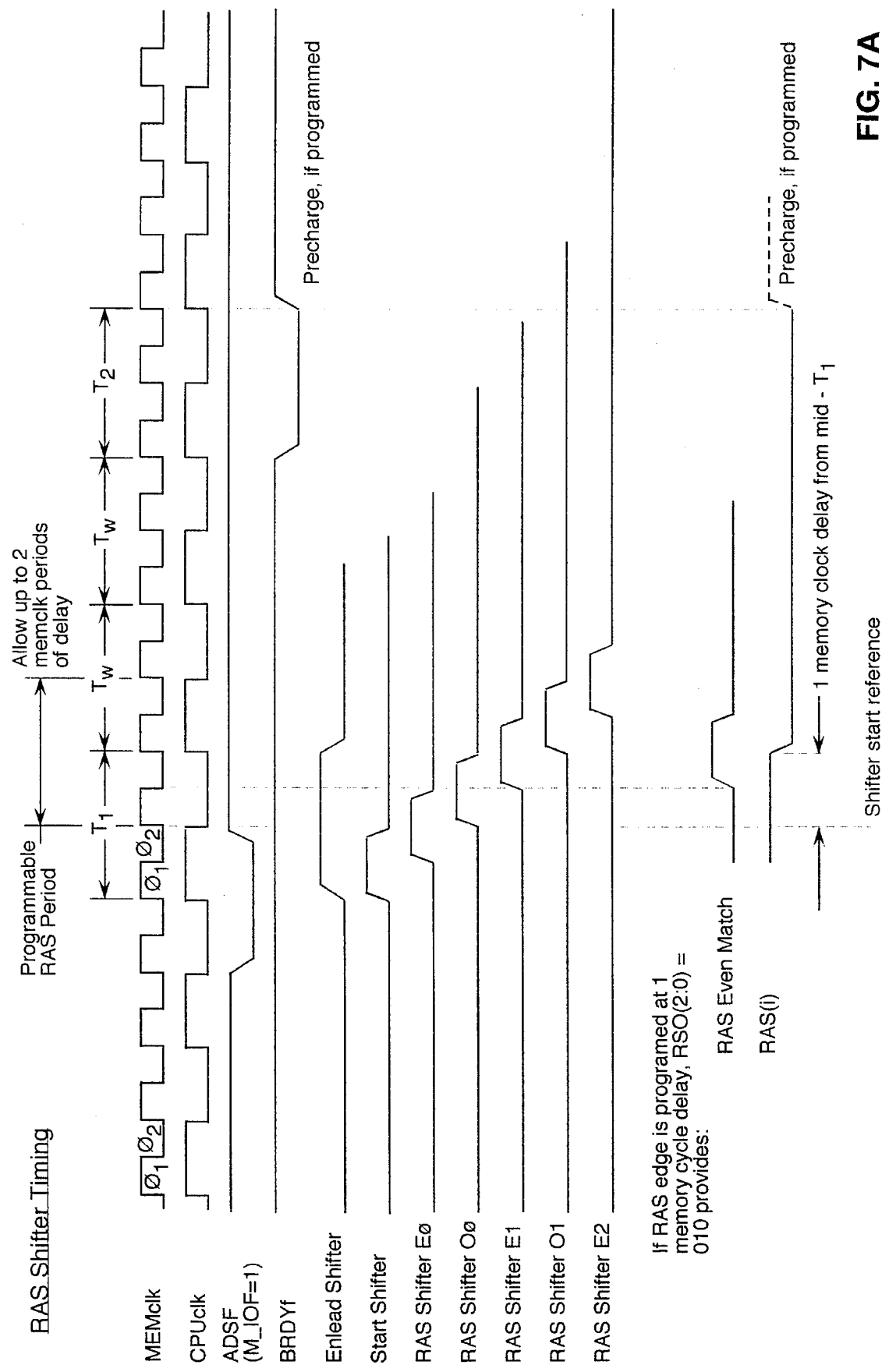
FIG. 7A depicts an exemplary timing diagram for the digital shifter of FIG. 4A.

FIG. 7A illustrates the signals generated when bits $Q_2$–$Q_0$ have been set with 010, in accordance with the above discussion. After ADS is received by the MCU, the enable lead shifter line from the DRAM controller 75 is pulsed, causing the start shifter signal output to go high on the high level ($\phi_1$) of the MemClk signal. The $E_0$ bit, which is the output $Q_0$ of latch 255, is pulsed for one MemClk cycle on the subsequent low level ($\phi_2$) of the MemClk signal. The $O_0$ bit is pulsed as the output of latch 256 on the subsequent high phase of MemClk, and the other cascaded latches are pulsed in similar fashion. When the even RAS delay lines match the encoded value of 00100, comparator 235 generates a pulse denoting a RAS even match. On the next high level ($\phi_1$) of the MemClk, the appropriate RAS line is asserted low.

Figure 6A:
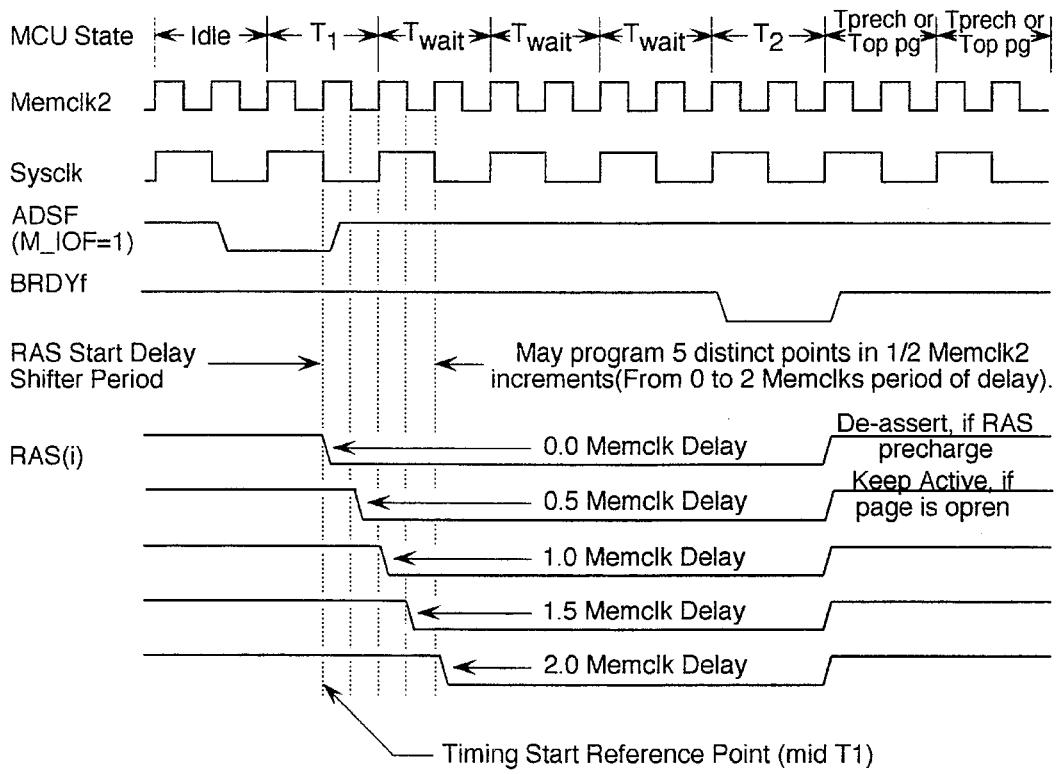
FIGS. 6A-6E show timing diagrams illustrating operation of the system depicted in FIGS. 2 and 4A-4C.

Referring now to FIG. 6A, the various delay periods for RAS are shown in accordance with the preferred embodiment. Each of these delay periods are measured from mid T1. In order to accommodate this timing, and as shown in FIG. 7A, the start shifter signal must be generated at the beginning of T1, which is one memory clock cycle prior to the first possible assertion of RAS. FIG. 6A also illustrates that, in accordance with the preferred embodiment, the RAS signal remains asserted until a precharge is received from bank precharge 55 by the appropriate latch (such as latch 182 in the above example) to clear the latch. In this manner, the appropriate page in memory will remain open until a new precharge cycle is initiated.

Figure 6B:
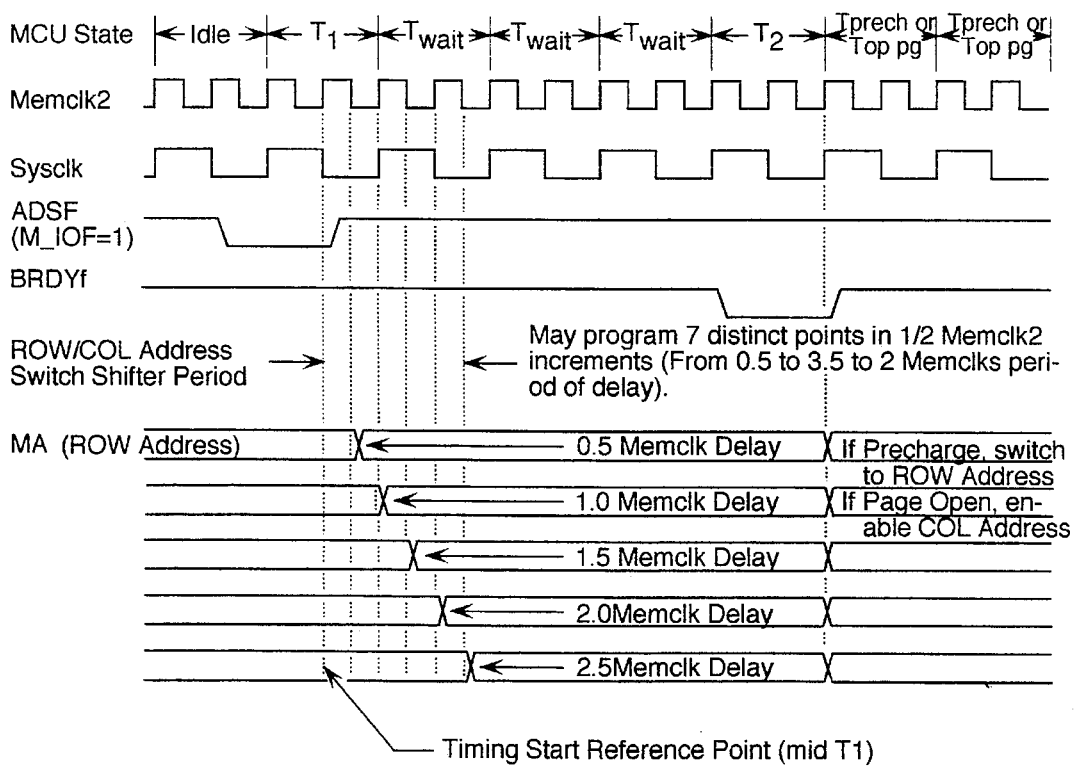
Figure 7B:
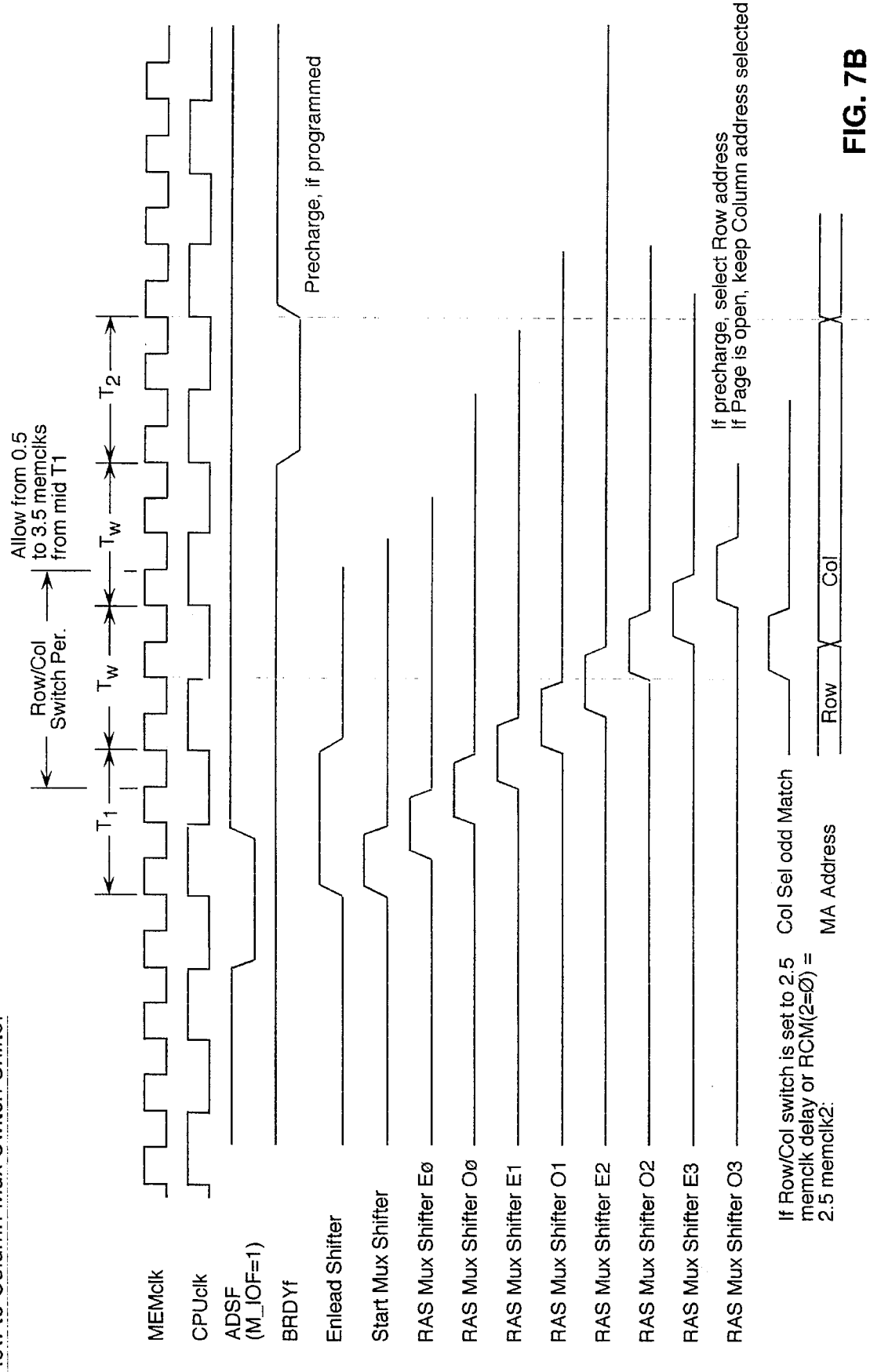
FIG. 7B depicts an exemplary timing diagram for the digital shifter of FIG. 4B.

Referring now to FIGS. 4B, 6B and 7B, the row-to-column mux switch shifter 300 will now be described. Referring initially to FIG. 4B, the row-to-column mux switch shifter (or mux shifter) 300 preferably comprises a 3:7 encoder 325, an even comparator 335, an odd comparator 345, a digital shifter 365, and a pair of output latches 392, 393. As will be apparent to one skilled in the art, mux shifter 300 operates in a fashion that is similar to RAS shifter 200.

The encoder 325 preferably receives bits $Q_5$–$Q_3$ from the DCR1 register 71, which represent the desired mux select switch delay as configured by the system BIOS. In response to this input from register 71, the encoder 325 preferably produces the following encoded signals:

TABLE VII

| DCR1 | | | ENCODER | | | | | | | DELAY FROM |
|---|---|---|---|---|---|---|---|---|---|---|
| $Q_5$ | $Q_4$ | $Q_3$ | Bit 6 | Bit 5 | Bit 4 | Bit 3 | Bit 2 | Bit 1 | Bit 0 | MID T1 |
| 0 | 0 | 0 | 0 | 0 | 0 | 0 | 0 | 0 | 1 | 0.5 MemClk delay |
| 0 | 0 | 1 | 0 | 0 | 0 | 0 | 0 | 1 | 0 | 1.0 MemClk delay |
| 0 | 1 | 0 | 0 | 0 | 0 | 0 | 1 | 0 | 0 | 1.5 MemClk delay |
| 0 | 1 | 1 | 0 | 0 | 0 | 1 | 0 | 0 | 0 | 2.0 MemClk delay |
| 1 | 0 | 0 | 0 | 0 | 1 | 0 | 0 | 0 | 0 | 2.5 MemClk delay |
| 1 | 0 | 1 | 0 | 1 | 0 | 0 | 0 | 0 | 0 | 3.0 MemClk delay |
| 1 | 1 | 0 | 1 | 0 | 0 | 0 | 0 | 0 | 0 | 3.1 MemClk delay |

Thus, the output line of encoder 325, which is shown in FIG. 4B as a seven line output, Row/Col Mux Delay (6:0), produces a shifted signal that is generated in response to the status of bits $Q_5$–$Q_3$. The even Row/Col Mux delay lines, which represent Bit5, Bit3, and Bit1 are provided as input signals to the "even" comparator 335 (because they represent even delay periods in Table VI), while the odd Row/Col Mux delay lines, which represent Bit6, Bit4, Bit 2 and Bit0, are provided to the "odd" comparator 345 (because they represent odd delay periods). The second input to both the even comparator 335 and to the odd comparator 345 is generated by digital shifter 365.

The digital shifter 365 preferably includes a one shot multivibrator 368 and a plurality of cascaded D-style latches 310–317. The one shot multivibrator 368 is enabled by a shifter enable output signal from DRAM controller 75, and functions to synchronize this shifter enable signal into a start shifter data pulse to the first latch 310. Because the Row/Col Mux delay, like the RAS delay, is measured from mid T1, the same shifter enable signal may be used for both digital shifter 265 and digital shifter 365. Moreover, the same latches (255–259 and 310–314) may be used to generate even bits $E_0$–$E_2$ and odd bits $O_0$–$O_1$, if desired.

Latch 310, therefore, preferably is enabled by the low level of the memory clock signal, MemClk$\phi_2$ to produce an output signal $Q_0$. Latch 310 preferably is denoted as an even latch or low level latch, so that the output signal $Q_0$ represents the least significant even bit $E_0$. The output signal $Q_0$ also is provided as the input signal to latch 311.

Latch 311 preferably is enabled by the high level of the memory clock signal, MemClk$\phi_1$, to produce an output signal $Q_1$. In accordance with the preferred embodiment, latch 311 represents an odd latch, or a high level latch, so that the output $Q_1$ represents the least significant odd bit $O_0$. The output of latch 311 also is provided as the input signal to latch 312, which preferably comprises an even latch that is enabled from the low phase of the memory clock signal, during MemClk$\phi_2$, to produce even bit $E_1$.

Latch 313 preferably comprises an odd latch that is enabled from the high level of the memory clock signal, during MemClk$\phi_1$ to produce odd bit $O_1$. Latch 313 receives as its input the output signal $Q_2$ from latch 312. The output signal from latch 313 $Q_3$ also is provided as the input to latch 314. Latch 314 preferably comprises an even latch and thus is enabled from the low phase of the memory clock signal, during MemClk$\phi_2$. The output of latch 314 $Q_4$ represents even bit $E_2$. Latches 315–317 are configured in similar fashion, as shown in FIG. 4B.

The outputs of latches 312, 314, 316 are provided as even bits $E_1$–$E_3$ on a three line bus 323 as the other input signal to even comparator 235. Similarly, the outputs of latches 311, 313, 315, 317 are provided as odd bits $O_0$–$O_3$ on a four line bus 327 as the other input signal to odd comparator 345.

Referring still to FIG. 4B, the even comparator 335 compares the even row/col mux delay bits (which comprise bit5, bit3 and bit1) with the even bits ($E_3$, $E_2$ and $E_1$) from digital shifter 365. If an exact match exists (i.e. bit5=$E_2$; bit3=$E_1$; and bit1=$E_0$) between the row/col mux delay bits and the even bits from digital shifter 365, comparator 335 produces an output pulse on output line 307. In similar fashion, the odd comparator 345 compares the odd row/col mux delay bits (which comprise bit6, bit 4, bit2, and bit0) with the odd bits ($O_3$, $O_2$, $O_1$ and $O_0$) from digital shifter 365. If an exact match occurs, comparator 345 produces an output pulse on output line 309.

The output line 307, which represents the output of even comparator 335, preferably is provided as an input to AND gate 372. Output line 309, which represents the output of odd comparator 345, is provided as an input to AND gate 373. A second input (labelled as Row/Col even and odd enable) is provided from the output of bit $Q_3$ from the DCR1 register 71 to AND gates 372, 373. This bit, $Q_3$, is used to select/enable one of the comparators. If $Q_3$ is a "0", an "odd" delay has been configured. Hence, the output of the "odd" comparator must be selected. IF $Q_3$ is a "1" the "even" comparator is selected. In AND gate 373, this input is inverted, while in AND gate 372 this input is provided directly as an input to the AND gate. Thus, if bit $Q_3$ is a "0," only the inverted input to AND gates 373 will be high. Conversely, if bit $Q_3$ is a "1," only the input to AND gates 372 will be high. Thus, as will be understood by one skilled in the art, only the output of AND gate 373 can go high if bit $Q_3$ is a "0," and only the output of AND gate 372 can go high if bit $Q_3$ is a "1."

In accordance with normal convention, AND gates 372, 373 only produce a high digital output (i.e. a "1") if both inputs are high. As a result of this configuration, only one of the AND gates 372, 373 can produce a high output if a match occurs between the row/col mux delay lines and the output of digital shifter 365. If no match occurs, neither of the AND gates 372, 373 will produce a high output. The AND gates 372, 373 will only produce a high output, therefore, if a match is found by the appropriate comparator 335, 345, and the DCR1 bit $Q_3$ is provided as a high input to the AND gate.

The output of AND gates 372, 373 is provided as a data input to a corresponding latch unit 392, 393, and as an input to a corresponding AND gate 382, 383. The other input to AND gates 382, 383 comprises either MemClk$\phi_1$ or MemClk$\phi_2$. The output of AND gate 382 is provided as an enable input to latches 392, and the output of AND gate 383 is provided as an enable input to latch 393. Thus, the output of AND gates 382, 383 only will go high if the corresponding output from AND gates 372, 373 is high and the proper level of the memory clock cycle signal is present.

When both corresponding AND gates (372 and 382, or 373 and 383) produce a high output signal, the associated latch 392, 393 will produce a high output signal at the Q output. This high output signal causes OR gate 395 to go high, thereby selecting the column row address by the DRAM multiplexer 70 (FIG. 2).

Thus, as an example, and with reference to FIGS. 4B and 7B, if bits $Q_5$, $Q_4$, and $Q_3$ of register 71 comprise 100, the encoded signal from encoder 325 will produce an output of 0010000. Bits 000 then are provided as input signals to comparator 335, and bits 0100 are provided as input signals to comparator 345. The row/col even/odd enable line will be low, reflecting the status of bit $Q_3$, and thus only AND gate 373 will receive a high input from the enable line through the invertor. As a result, only the output of AND gate 373 can go high. After the shifter enable signal is received from the DRAM controller 75, and after the pulse propagates through to latch 315, a match will occur at comparator 335, 345, resulting in an output pulse on lines 307, 309. A pulse on line 309 will cause the output of AND gate 373 to go high, producing a "1" at the input of latch 393. On the falling edge of the memory clock, during MemClk$\phi_2$, AND gate 383 also will produce a high output, thereby enabling latch 393 to clock in the high input from AND gate 373, and producing a high output at the Q output of latch 393. The high output from latch 393 then produces a high output at the output of OR gate 395, thus asserting the select column line from the falling MemClk edge, with a delay of 2.5 MemClk from mid T1 (as dictated by bits $Q_5$–$Q_3$ of DCR1 register 71).

FIG. 7B illustrates the signals generated when bits $Q_5$–$Q_3$ have been set with 100, in accordance with the above discussion. After ADS is received by the MCU, the enable lead shifter line from the DRAM controller 75 is pulsed, causing the start shifter signal output to go high on the rising edge ($\phi_1$) of the MemClk signal. The $E_0$ bit, which is the output $Q_0$ of latch 310, is pulsed for one MemClk cycle on the subsequent falling edge ($\phi_2$) of the MemClk signal. The $O_0$ bit is pulsed as the output of latch 311 on the subsequent rising MemClk edge, and the other cascaded latches are pulsed in similar fashion. When the odd row/col mux delay lines match the encoded value of 0100, comparator 345 generates a pulse denoting an odd match. On the next falling edge ($\phi_2$) of the MemClk, the column address is driven by the DRAM multiplexer 70.

Referring now to FIG. 6B, the various delay periods for the Row/Col address mux switch shifter timing is shown in accordance with the preferred embodiment. Each of these delay periods are measured from mid T1. In order to accommodate this timing, and as shown in FIG. 7B, the start shifter signal must be generated at the beginning of T1, which is one memory clock cycle prior to the first possible assertion of RAS. FIG. 6B also illustrates that, in accordance with the preferred embodiment, another column address is driven unless a precharge is received from bank precharge 55 by the appropriate latch (such as latch 393 in the above example) to clear the latch. In this manner, the appropriate page in memory will remain open until a new precharge cycle is initiated.

Referring now to FIG. 4C, the CAS shifter circuit 400 is constructed in similar fashion to the RAS shifter circuit 200. As shown in FIG. 4C, the CAS delay shifter circuit 400 preferably comprises a 3:6 encoder 425, two digital comparators 435, 445, a plurality of pipelined latches 410–417, comprising a digital shifter 465 and eight output latches 490–497. In accordance with the preferred embodiment of FIG. 4C, the various latches are clocked from either the rising or falling edge of the memory clock (MemClk) signal. The high phase of MemClk is denoted as $\phi_1$, while the low phase of MemClk is denoted as $\phi_2$.

Referring still to FIG. 4C, the encoder 425 preferably receives bits $Q_0$–$Q_2$ from the DCR2 register 72, which represent the desired CAS Read delay as configured by the system BIOS. In response to this input from register 72, the encoder 425 preferably produces the following encoded signals:

TABLE VIII

| DCR2 | | | ENCODER | | | | | | READ DELAY |
|---|---|---|---|---|---|---|---|---|---|
| $Q_2$ | $Q_1$ | $Q_0$ | Bit 5 | Bit 4 | Bit 3 | Bit 2 | Bit 1 | Bit 0 | FROM MID T1 |
| 0 | 0 | 0 | 0 | 0 | 0 | 0 | 0 | 1 | 1.0 MemClk delay |
| 0 | 0 | 1 | 0 | 0 | 0 | 0 | 1 | 0 | 1.5 MemClk delay |
| 0 | 1 | 0 | 0 | 0 | 0 | 1 | 0 | 0 | 2.0 MemClk delay |
| 0 | 1 | 1 | 0 | 0 | 1 | 0 | 0 | 0 | 2.5 MemClk delay |
| 1 | 0 | 0 | 0 | 1 | 0 | 0 | 0 | 0 | 3.0 MemClk delay |
| 1 | 0 | 1 | 1 | 0 | 0 | 0 | 0 | 0 | 3.5 MemClk delay |

Thus, the output line of encoder 425, which is shown in FIG. 4C as a six line output, CAS Delay (5:0), produces a shifted signal that is generated in response to the status of bits $Q_0$–$Q_2$. The even CAS delay lines, which represent Bit4, Bit2, and Bit0, are provided as input signals to the "even" comparator 435, while the odd CAS delay lines, which represent Bit5, Bit3 and Bit1, are provided to the "odd" comparator 445. The second input to both the even comparator 435 and to the odd comparator 445 is generated by digital shifter 465.

The digital shifter 465 preferably includes a one shot multivibrator 468 and a plurality of cascaded D-style latches 410–417. The one shot multivibrator 468 is enabled by the shifter enable output signal from DRAM controller 75. The multivibrator 468 functions to synchronize this shifter enable signal into a start shifter data pulse to the first latch 410. Latch 410 preferably is enabled from the falling edge of the memory clock signal, MemClk$\phi_2$, to produce an output signal $Q_0$. Latch 410 preferably is denoted as an even latch or falling edge latch, so that the output signal $Q_0$ represents the least significant even bit $E_0$. The output signal $Q_0$ also is provided as the input signal to latch 411.

Latch 411 preferably is enabled by the high level of the memory clock signal, during MemClk$\phi_1$, to produce an output signal $Q_1$. In accordance with the preferred embodiment, latch 411 represents an odd latch, or a rising edge latch, so that the output $Q_1$ represents the least significant odd bit $O_0$. The output of latch 411 also is provided as the input signal to latch 412, which preferably comprises an even latch that is enabled by the low level of the memory clock signal, during MemClk$\phi_2$, to produce even bit $E_1$.

Latch 413 preferably comprises an odd latch that is enabled by the high level of the memory clock signal, MemClk$\phi_1$ to produce odd bit $O_1$. Latch 413 receives as its input the output signal $Q_2$ from latch 412. The output signal from latch 413 $Q_3$ also is provided as the input to latch 414. Latch 414 preferably comprises an even latch and thus is enabled during the low level of the memory clock signal MemClk$\phi_2$. The output of latch 414 $Q_4$ represents even bit $E_2$. Latches 415–417 are constructed in similar fashion to give odd bits $O_2$ and $O_3$, and even bit $E_3$.

The outputs of latches 412, 414, 416 are provided as even bits $E_2$–$E_0$ on a three line bus 418 as the other input signal to even comparator 435. Similarly, the outputs of latches 413, 415, and 417 are provided as odd bits $O_2$–$O_0$ on a three line bus 419 as the other input signal to odd comparator 445.

Referring still to FIG. 4C, the even comparator 435 compares the even CAS delay bits (which comprise bit4, bit2 and bit0) with the even bits ($E_3$, $E_2$ and $E_1$) from digital shifter 465. If an exact match exists (i.e. bit4=$E_3$; bit2=$E_2$; and bit0=$E_1$) between the CAS delay bits and the even bits from digital shifter 465, comparator 435 produces an output pulse on output line 407. In similar fashion, the odd comparator 445 compares the odd CAS delay bits (which comprise bit5, bit3 and bit1) with the odd bits ($O_3$, $O_2$, and $O_1$) from digital shifter 465. If an exact match occurs, comparator 445 produces an output pulse on output line 409.

The output line 407, which represents the output of even comparator 435, preferably is provided as an input to AND gates 480, 482, 484, 486. Output line 409, which represents the output of odd comparator 445, is provided as an input to AND gates 481, 483, 485, 487. A second input (labelled as CAS odd enable/CAS even enable) to the AND gates 480–487 is provided from the output of bit $Q_0$ (the least significant bit) from the DCR2 register 72. $Q_0$ is used to select the output of one of the comparators. If $Q_0$=0, an "even" delay has been programmed and the output of the even comparator is selected. If $Q_0$=1, the output of the odd comaprator is selected. In AND gates 480, 482, 484, 486, this input is inverted, while in AND gates 481, 483, 485, 487 the input is provided directly to the AND gate. Thus, if bit $Q_0$ is a "0," only the inverted inputs to AND gates 480, 482, 484, 486 will be high. Conversely, if bit $Q_0$ is a "1," only the inputs to AND gates 481, 483, 485, 487 will be high. Thus, as will be understood by one skilled in the art, only the output of AND gates 480, 482, 484, 486 can go high if bit $Q_0$ is a "0," and only the output of AND gates 481, 483, 485, 487 can go high if bit $Q_1$ is a "1".

The third input to AND gates 480–487 is provided as the byte select output signal from DRAM address router 60. As shown in the preferred embodiment, the byte(0) select line is applied as an input to AND gates 480, 481; the byte(1) select line is provided as an input to AND gates 482, 483; the byte(2) select line is provided as an input AND gates 84, 485; and the byte(3) select line is provided as an input to AND gates 486, 487. Thus, as will be understood by one skilled in the art, only the outputs of AND gates 480, 481 can go high if byte(0) is selected, only the outputs of AND gates 482, 483 can go high if bank (1) is selected, and so forth for AND gates 484–487.

In accordance with normal convention, AND gates 480–487 only produce a high digital output (i.e. a "1") if all three inputs are high. As a result of this configuration, only one of the AND gates 480–487 can produce a high output if a match occurs between the CAS delay lines and the output of digital shifter 465. If no match occurs, none of the AND gates will produce a high output. The AND gates 480–487 will only produce a high output, therefore, if a match is found by the appropriate comparator 435, 445, the appropriate byte select line has been selected, and the least significant bit $Q_0$ is provided as a high input to the AND gate.

The output of AND gates is provided as a data input to a corresponding latch unit 490–497, and as an input to a corresponding AND gate 470–477. The other input to AND gates 470–477 comprises either MemClk$\phi_1$ or MemClk$\phi_2$. The output of AND gates 470–477 are provided as enable inputs to latches 490–497. The output of AND gates 470–477 only will go high if the corresponding output from AND gates 480–487 is high and the proper level of the memory clock cycle signal is present.

When both corresponding AND gates produce a high output signal, the associated latch will produce a low output signal at the Q(bar) output. This low output signal causes an AND gate to go low, thereby asserting the appropriate CAS line.

Figure 6C:
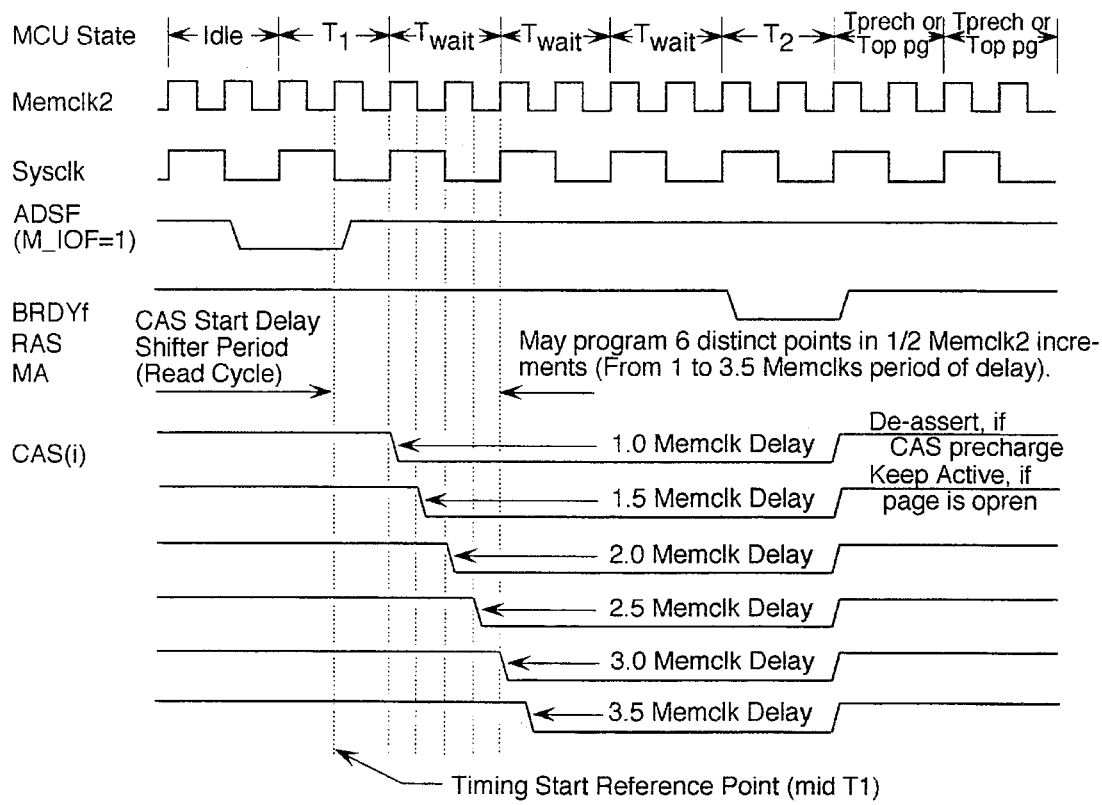

Referring now to FIG. 6C, the various delay periods for CAS read are shown in accordance with the preferred embodiment. Each of these delay periods are measured from mid T1. In order to accommodate this timing, the start shifter signal must be generated at the beginning of T1, which is one memory clock cycle prior to the first possible assertion of RAS. FIG. 6C also illustrates that, in accordance with the preferred embodiment, the CAS signal remains asserted until a CAS Start precharge is received from the DRAM Controller 55 by the appropriate latch, to clear the latch. In this manner, the appropriate page in memory will remain open until a new precharge cycle is initiated. This start precharge signal is sent to the Read CAS shifter at the end of the $T_2$ cycle during which BRDY issues, after all wait-states (if any) are transpired. In addition, all of the signals issued from the DRAM controller must be one-shot since SysClk has multiple periods of MemClk's.

Figure 6D:
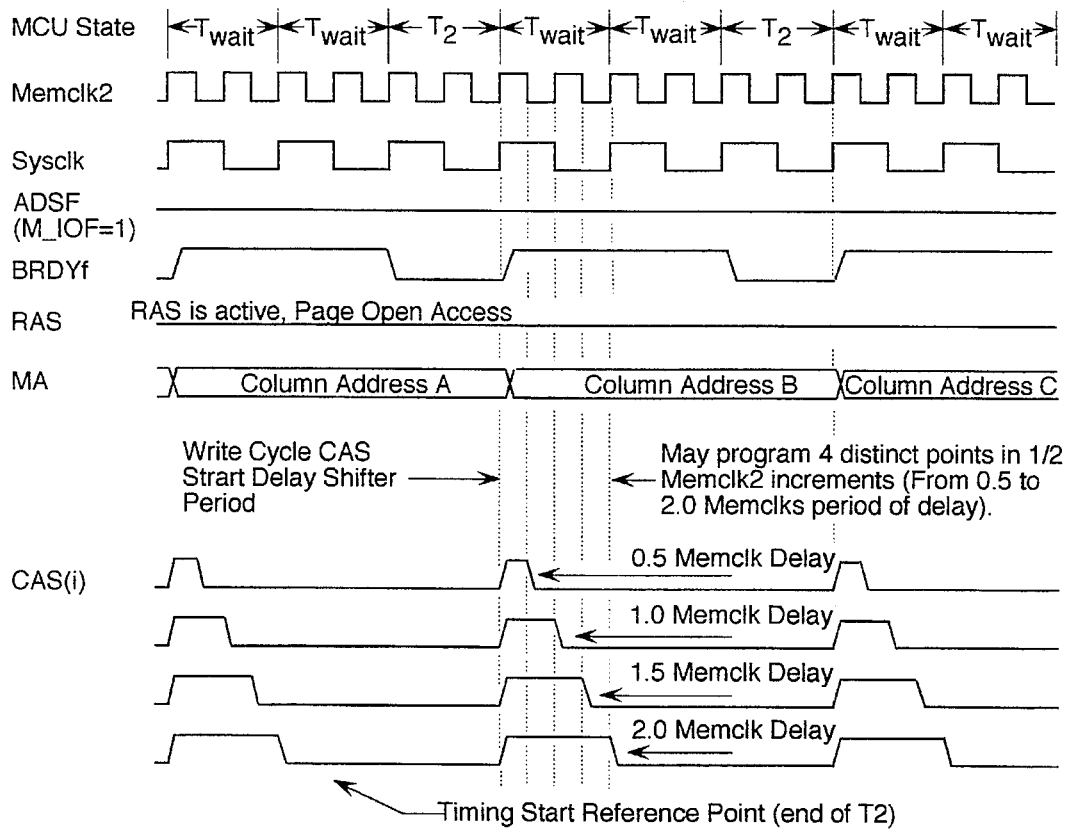

FIG. 6D illustrates the desired timing parameters for a CAS read in a burst or page open cycle. These parameters are derived from the status of bits $Q_4$ and $Q_3$ in the DCR2 register 72. As shown in FIG. 6D, the delay periods are measured from the end of T2, and determine the CAS precharge pulse duration. The timing parameters of FIG. 6D can be implemented by one skilled in the art by constructing another CAS shifter circuit (not shown) in similar fashion or by modifying CAS shifter circuit (400).

Figure 6E:
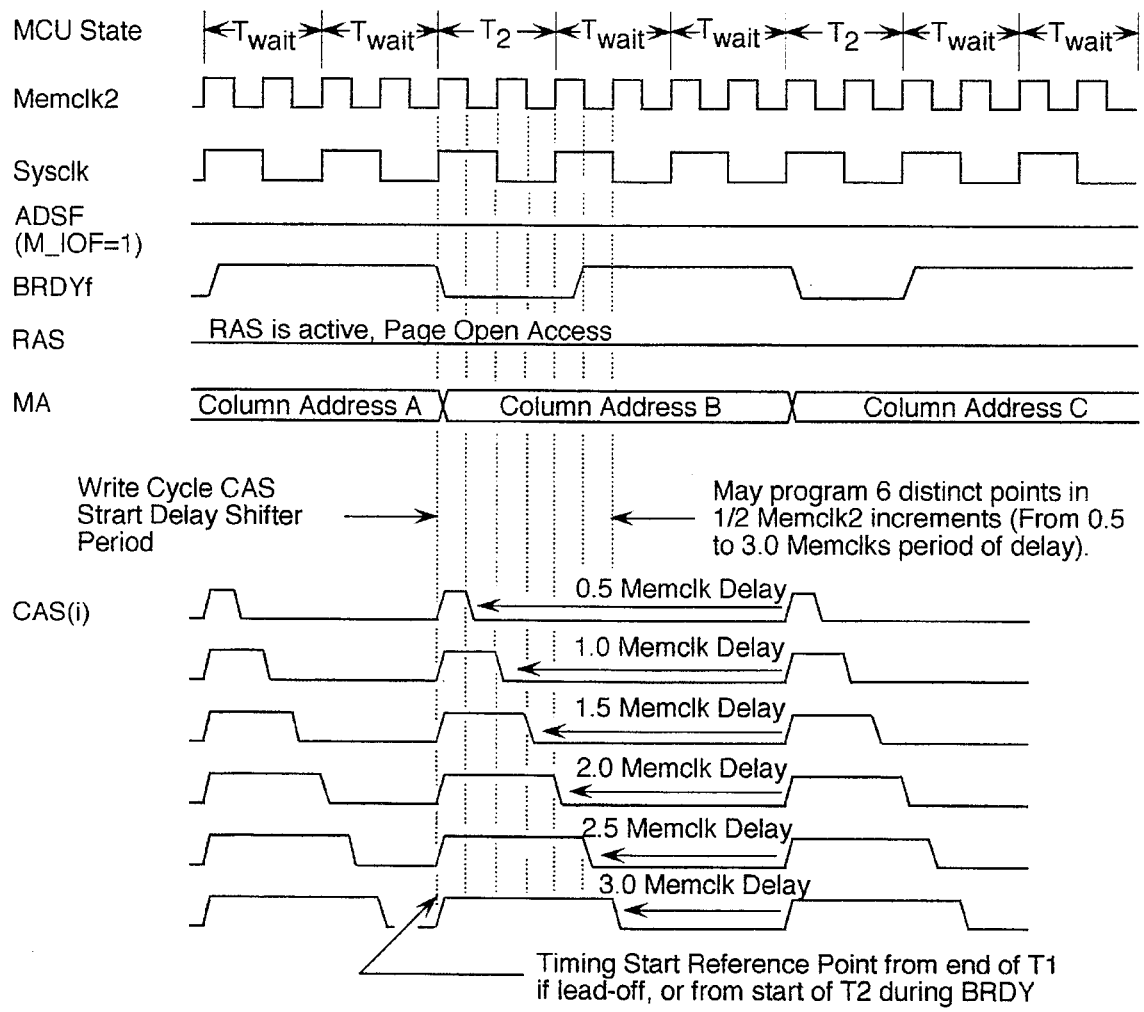

FIG. 6E illustrates the desired timing parameters for a CAS write cycle, for both a lead-off cycle, or a burst cycle. These parameters are derived from the status of bits $Q_2$–$Q_0$ in the DCR3 register 73. As shown in FIG. 6E, the delay periods are measured from the end of T1 if the transaction is a lead-off cycle, or from the start of T2 during a burst or page open cycle (when BRDY is asserted). The timing parameters of FIG. 6E also can be implemented in similar fashion by one skilled in the art.

Numerous variations and modifications will become apparent to those skilled in the art once the above disclosure is fully appreciated. Thus, while a preferred embodiment of the invention has been shown and described, modifications thereof can be made by one skilled in the art without departing from the spirit of the invention. It is intended that the following claims be interpreted to embrace all such variations and modifications.

What is claimed is:

1. A memory control unit for controlling memory transactions to a memory array, comprising:

a programmable edge generator for generating control signals with desired delay periods, said control signals including row address strobe (RAS) signals;

a controller for enabling said edge generator; and a configuration register including dedicated bits for establishing said desired delay periods;

wherein said programmable edge generator comprises a RAS shifter circuit, said RAS shifter circuit including an encoder connected to said configuration register to produce an encoded output signal on a RAS delay line bus.

2. A memory control unit as in claim 1, wherein said shifter circuit includes a digital shifter comprised of a plurality of cascaded latches.

3. A memory control unit as in claim 2, wherein the cascaded latches produce even and odd shifter bits.

4. A memory control unit as in claim 3, wherein the latches are clocked on either the rising or falling edge of a memory clock signal.

5. A memory control unit as in claim 4, further comprising a comparator for comparing the even and odd shifter bits with the encoded output signal.

6. A memory control unit as in claim 2, wherein the digital shifter is enabled by said controller.

7. A memory control unit as in claim 6, wherein said controller enables said digital shifter at the start of a T1.

8. A memory control unit for controlling memory transactions to a memory array, comprising:

a programmable edge generator for generating control signals with desired delay periods, said control signals including column address strobe (CAS) signals;

a controller for enabling said edge generator; and a configuration register including dedicated bits for establishing said desired delay periods;

wherein said programmable edge generator comprises a CAS shifter circuit, said CAS shifter circuit including an encoder connected to said configuration register to produce an encoded output signal on a CAS delay line bus.

9. A memory control unit as in claim 8, wherein the number of CAS delay lines represents the number of different available delay periods.

10. A memory control unit as in claim 9, wherein said CAS shifter circuit includes a digital shifter comprised of a plurality of cascaded latches.

11. A memory control unit as in claim 10, wherein the cascaded latches produce even and odd shifter bits.

12. A memory control unit as in claim 11, wherein the latches are clocked on either the rising or falling edge of a memory clock signal.

13. A memory control unit as in claim 12, further comprising a comparator for comparing the even and odd shifter bits with the encoded output signal.

14. A memory control unit as in claim 13, wherein said comparator includes an even comparator for comparing even shifter bits with even CAS delay lines.

15. A memory control unit as in claim 13, wherein said comparator includes an odd comparator for comparing odd shifter bits with odd CAS delay lines.

16. A memory control unit for controlling memory transactions to a memory array, comprising:

a programmable edge generator for generating control signals with desired delay periods;

a controller for enabling said edge generator; and a configuration register including dedicated bits for establishing said desired delay periods; and a multiplexer connected to said memory array for switching between a row address and a column address that is supplied to said memory array;

wherein said programmable edge generator comprises a row to column address multiplexer shifter circuit, said row to column address multiplexer shifter circuit including an encoder connected to said configuration register to produce an encoded output signal.

17. A memory control unit as in claim 16, wherein said row to column address multiplexer shifter circuit includes a digital shifter comprised of a plurality of cascaded latches.

* * * * *